United States Patent
Ippolito et al.

(10) Patent No.: US 8,260,468 B2
(45) Date of Patent: Sep. 4, 2012

(54) AGGREGATOR, MONITOR, AND MANAGER OF DISTRIBUTED DEMAND RESPONSE

(75) Inventors: David Ippolito, Glen Mills, PA (US); Peter Cona, Chadds Ford, PA (US)

(73) Assignee: Versify Solutions, Inc., Chadds Ford, PA (US)

( * ) Notice: Subject to any disclaimer, the term of this patent is extended or adjusted under 35 U.S.C. 154(b) by 76 days.

(21) Appl. No.: 12/492,012

(22) Filed: Jun. 25, 2009

(65) Prior Publication Data
US 2009/0326726 A1 Dec. 31, 2009

Related U.S. Application Data

(60) Provisional application No. 61/075,742, filed on Jun. 25, 2008.

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl. ......... 700/286; 700/291; 700/297; 700/298
(58) Field of Classification Search .................. 700/286, 700/291, 297–298; 705/37, 412
See application file for complete search history.

(56) References Cited

U.S. PATENT DOCUMENTS

| | | | |
|---|---|---|---|
| 5,964,879 A | 10/1999 | Dunstan et al. | |
| 6,021,402 A | 2/2000 | Takriti | |
| 6,473,744 B1 | 10/2002 | Tuck et al. | |
| 6,633,823 B2 * | 10/2003 | Bartone et al. | 702/57 |
| 7,020,701 B1 | 3/2006 | Gelvin et al. | |
| 7,142,949 B2 * | 11/2006 | Brewster et al. | 700/286 |
| 7,162,444 B1 | 1/2007 | Machado et al. | |
| 7,246,156 B2 | 7/2007 | Ginter et al. | |
| 7,305,281 B2 * | 12/2007 | Scott et al. | 700/286 |
| 7,398,194 B2 * | 7/2008 | Evans et al. | 703/18 |
| 7,747,739 B2 * | 6/2010 | Bridges et al. | 709/224 |
| 7,752,106 B1 | 7/2010 | Corby et al. | |
| 7,840,607 B2 | 11/2010 | Henigman et al. | |
| 7,873,441 B2 * | 1/2011 | Synesiou et al. | 700/286 |

(Continued)

OTHER PUBLICATIONS

Li, Guang, "Day-Ahead Electricity Price Forecasing in a Grid Environment," IEEE Transactions on Power Systems, vol. 22, No. 1, Feb. 2007.

(Continued)

*Primary Examiner* — Ronald Hartman, Jr.
(74) *Attorney, Agent, or Firm* — Morgan, Lewis & Bockius LLP

(57) ABSTRACT

The invention broadly encompasses a system including a database to store demand response data, the demand response data including demand response agreement parameters, demand response load and energy demand characteristics of one or more demand response customers, the demand response load characteristics including power consumption capacity of each of one or more demand response loads, an aggregator to aggregate the demand response loads based on the demand response data and forecast data into a demand response portfolio, a monitor to monitor power demand of one or more demand response customers and one or more power grids, and a dispatcher to notify the one or more demand response customers of the demand response portfolio and to notify a utility of a response from the one or more demand response customers whether to control the demand response load to return the power consumption capacity of the demand response load back to the one or more power grids.

9 Claims, 31 Drawing Sheets

U.S. PATENT DOCUMENTS

| | | | |
|---|---|---|---|
| 7,873,442 B2 | 1/2011 | Tsui | |
| 7,877,235 B2* | 1/2011 | McConnell et al. | 702/188 |
| 7,885,917 B2* | 2/2011 | Kuhns et al. | 706/48 |
| 7,930,070 B2* | 4/2011 | Imes | 700/291 |
| 8,019,697 B2* | 9/2011 | Ozog | 705/412 |
| 8,068,938 B2* | 11/2011 | Fujita | 700/295 |
| 2002/0147670 A1* | 10/2002 | Lange | 705/35 |
| 2003/0055776 A1 | 3/2003 | Samuelson | 705/37 |
| 2003/0163224 A1 | 8/2003 | Klaar et al. | |
| 2003/0182250 A1 | 9/2003 | Shihidehpour et al. | |
| 2004/0024483 A1* | 2/2004 | Holcombe | 700/122 |
| 2005/0004858 A1* | 1/2005 | Foster et al. | 705/36 |
| 2005/0027636 A1* | 2/2005 | Gilbert et al. | 705/37 |
| 2005/0125104 A1 | 6/2005 | Wilson et al. | |
| 2005/0171704 A1 | 8/2005 | Lewis et al. | |
| 2005/0197742 A1* | 9/2005 | Scott et al. | 700/286 |
| 2005/0234600 A1* | 10/2005 | Boucher et al. | 700/286 |
| 2006/0047369 A1* | 3/2006 | Brewster et al. | 700/291 |
| 2006/0155423 A1* | 7/2006 | Budike, Jr. | 700/286 |
| 2007/0124026 A1* | 5/2007 | Troxell et al. | 700/291 |
| 2007/0220907 A1* | 9/2007 | Ehlers | 62/126 |
| 2007/0271173 A1 | 11/2007 | Johnson et al. | |
| 2008/0049013 A1 | 2/2008 | Nasle | |
| 2008/0091580 A1 | 4/2008 | Kremen | |
| 2008/0167756 A1* | 7/2008 | Golden et al. | 700/297 |
| 2008/0177678 A1* | 7/2008 | Di Martini et al. | 705/412 |
| 2009/0083167 A1* | 3/2009 | Subbloie | 705/34 |
| 2009/0187284 A1* | 7/2009 | Kreiss et al. | 700/291 |
| 2009/0187499 A1* | 7/2009 | Mulder et al. | 705/30 |
| 2009/0281674 A1* | 11/2009 | Taft | 700/286 |
| 2010/0064001 A1* | 3/2010 | Daily | 709/203 |
| 2010/0145532 A1 | 6/2010 | Gregory et al. | |
| 2010/0179862 A1 | 7/2010 | Chassin et al. | |
| 2011/0060476 A1* | 3/2011 | Iino et al. | 700/297 |

OTHER PUBLICATIONS

Feng, Xiaoming et al., "A new breed of software tool for integrated electrical power system and market analysis-GridView," Power Engineering Society Summer Meeting, 2002 IEEE, vol. 2, 25-25, pp. 737-743, Jul. 2002.

Wang, Hui-Fung Francis, "Power Systems Locational Marginal Pricing in Deregulated Markets," A dissertation, Tulane University, 2003.

Yang, Jian, "A market monitoring system for the open electricity markets," Power Engineering Society Summer Meeting, IEEE, vol. 1, pp. 235-240, 2001.

Hong, Ying-Yi, et al., "A neuro-fuzzy price forecasting approach in deregulated electricity markets," Electrical Power Systems Research, vol. 73, pp. 151-157, 2005.

Henderson, M. et al., "Planning for reliability, economics, and the environment in a deregulated market," Power and Energy Society General Meeting—Conversion and Delivery of Electrical Energy in the 21st Century, 2008 IEEE, pp. 1-9, Jul. 20-24, 2008.

* cited by examiner

Asset Profile Database: Customer Signed Decomposition 300

Portfolio Management: Application – High Level Summary 400

1500A

1500H

Daily Summary

| Dispatch Date | HE | ZZZ Schedule MW | ZZZ Loss % | ZZZ Loss MW | YYY Schedule MW | YYY Loss % | YYY Loss MW | Total Output Required MW | Plant Net | Difference | Plant Fuel | Plant Heat Rate | Ambient Temp Deg.F |
|---|---|---|---|---|---|---|---|---|---|---|---|---|---|
| 12/27/2007 | 1 | | 1.5 | | | 5 | | | 3 | 3 | | | 35.8 |
| 12/27/2007 | 2 | | 1.5 | | | 5 | | | -2.1 | -2.1 | | | 35.2 |
| 12/27/2007 | 3 | | 1.5 | | | 5 | | | -2.1 | -2.1 | | | 36.5 |
| 12/27/2007 | 4 | | 1.5 | | | 5 | | | -2.1 | -2.1 | | | 35.5 |
| 12/27/2007 | 5 | 25 | 1.5 | .4 | | | | | 4 | -3.4 | 216 | -63.811 | 34.2 |
| 12/27/2007 | 6 | 225 | 1.5 | 3.4 | | | | | 89 | -.2 | 413 | 16.67 | 33.1 |
| 12/27/2007 | 7 | 250 | 1.5 | 3.8 | | | | | .4 | -13.6 | 1887 | 8.802 | 32 |
| 12/27/2007 | 8 | 450 | 1.5 | 6.8 | | | | | .2 | 10.2 | 2248 | 8.507 | 33.1 |
| 12/27/2007 | 9 | 450 | 1.5 | 6.8 | | | | | 7.7 | -9.3 | 3132 | 6.996 | 35.2 |
| 12/27/2007 | 10 | 450 | 1.5 | 6.8 | | | | | 7 | | 3302 | 7.225 | 37 |
| 12/27/2007 | 11 | 450 | 1.5 | 6.8 | | | | | 6.9 | -.1 | 3183 | 6.966 | 36.2 |
| 12/27/2007 | 12 | 450 | 1.5 | 6.8 | | | | | 7 | | 3291 | 7.201 | 39.3 |
| 12/27/2007 | 13 | 450 | 1.5 | 6.8 | | | | | 7 | | 3175 | 6.948 | 48.2 |
| 12/27/2007 | 14 | 450 | 1.5 | 6.8 | | | | | 7 | | 3286 | 7.191 | 41.2 |
| 12/27/2007 | 15 | 450 | 1.5 | 6.8 | | | | | 7 | | 3181 | 6.961 | 42.6 |
| 12/27/2007 | 16 | 450 | 1.5 | 6.8 | | | | | 7 | | 3173 | 6.944 | 42.5 |
| 12/27/2007 | 17 | 450 | 1.5 | 6.8 | | | | | 7 | -.1 | 3286 | 7.191 | 40.1 |
| 12/27/2007 | 18 | 450 | 1.5 | 6.8 | | | | | | | 3183 | 6.965 | 35.8 |
| 12/27/2007 | 19 | 450 | 1.5 | 6.8 | | | | | | | 3279 | 7.174 | 34.8 |
| 12/27/2007 | 20 | 450 | 1.5 | 6.8 | | | | 457 | 456.9 | | 3178 | 6.955 | 33.6 |
| 12/27/2007 | 21 | 450 | 1.5 | 6.8 | | | 5 | 457 | 457 | | 3286 | 7.19 | 32.9 |
| 12/27/2007 | 22 | 450 | 1.5 | 6.8 | | | 5 | 457 | 447.6 | -9.8 | 3170 | 7.089 | 31.8 |
| 12/27/2007 | 23 | 200 | 1.5 | 3 | | | 5 | 203 | 221.6 | 8.8 | 1652 | 7.809 | 31.3 |
| 12/27/2007 | 24 | 200 | 1.5 | 3 | | | 5 | 203 | 195.9 | -7.1 | 1467 | 7.488 | 30.8 |
| TOTAL | | 7200 | | 108 | | | | 7311 | 7282.9 | -28.1 | | 7.276 | |

1601A
Daily Reports
Daily Summary
Day Forecasted Availability
Daily Log
Trading Summary

| Edit | Unit | Event Type | Start Time | End Time | Event Time | Log Entity | Made By | Entered | Ack By |
|---|---|---|---|---|---|---|---|---|---|
| Edit | Sample | Actual Start | | | 02/20/2008 08:02 | Note Change Breaker Closed This is another comment This is a change | versify | 02/20/2008 08:06 | versify |
| Edit | Sample | Actual Start | | | 02/20/2008 08:02 | Breaker Closed. This is another comment | versify | 02/20/2008 08:03 | |
| Edit | Sample | General Note | 02/02/2008 05:57 | | | General Note: Sample Comment | versify | 02/20/2008 05:58 | versify |
| Edit | Sample | Schedule Update | 02/02/2008 01:59 | 02/02/2008 23:59 | | Schedule changed. Sold 375 to xyz | versify | 02/20/2008 06:00 | |
| Edit | Sample | Schedule Update | 02/02/2008 01:59 | 02/02/2008 01:59 | | Schedule changed. Sold 375 to xyz | versify | 02/20/2008 05:59 | |
| Edit | Sample CT1A | Derate (max cap change) | 02/02/2008 00:00 | 02/02/2008 | | Planned Derating: Sample CT1A Pump Work/Problem (derateId: 33) | versify | 02/20/2008 08:12 | versify |
| Edit | Sample | Actual Start | 02/19/200 01:59 | | | Breaker Closed: Sample Comment | versify | 02/20/2008 07:00 | |
| Edit | Sample | Schedule Update | 02/19/200 00:00 | | | Schedule created: 300 MW | versify | 02/20/2008 06:59 | |
| Edit | Sample CT1A | Derate (max cap change) | 02/18/200 06:09 | | | Unplanned Derating: Sample CT1 Annual Inspections (derateId: 32) | versify | 02/20/2008 07:00 | |
| Edit | Sample | General Note | | | | General Note: ZZZZ: Turning gear disengaged (S1L33TGE.OUT/SIG). | auto | 02/20/2008 06:09 | |
| Edit | Sample CT1A | Actual Start | | | | General Note: Breaker Closed for ZZZZ CT1A | auto | 02/20/2008 05:49 | |
| Edit | Sample | Actual Start | | | | General Note: Breaker Closed for ZZZZ CT1B | auto | 02/20/2008 | |

Event Type
- Actual Shutdown
- Actual Start
- Derate (max cap change)
- Generate Note
- Schedule Change
- Schedule Test
- Schedule Update
- Trip (max cap change)
- Workorder
- Impacting Operations

| Station/Unit | Temp | HR | Scheduled MW | Actual MW | nox (lbs/hr) | CO (lbs/hr) | O2 (%) |
|---|---|---|---|---|---|---|---|
| | | | Operations | | | Emissions | |
| Sample | 57.53315 | 7220.496 | 457 | 456.828 | 10.445196 | 19.98221964 | 16.965087915 |
| Sample CT1A | 57.53315 | | | 153.2184 | 1.999554 | 0.01491964 | 13.91466 |
| Sample CT1B | 57.53315 | | | 154.4512 | 8.456642 | 19.9673 | 0.01551583 |
| Sample ST1 | 57.53315 | | | 150.7081 | | | |

Technology
BWR
CCGT
CCGT Steam
Diesel
Fluidized Bed
Combustion
Fossil Steam
Gas Turbine
Geothermal
Hydro
Jet
Pumped Storage
PWR
Wind Turbine

2101A

2100A

AGGREGATOR, MONITOR, AND MANAGER OF DISTRIBUTED DEMAND RESPONSE

This application claims the benefit of U.S. provisional patent application No. 61/075,742, which was filed on Jun. 25, 2008 and is incorporated herein by reference in its entirety.

I. FIELD OF THE INVENTION

The present invention relates to a system facilitating the utilization of distributed demand response capacities, and more particularly to a distributed demand response aggregator, monitor, and manager. The present invention also relates to a performance monitor and reporter for distributed demand response, and more particularly to a performance monitor and reporter for distributed demand response that is adaptable to handle data from any data source.

II. DISCUSSION OF THE RELATED ART

As demand for energy continues to rise, it becomes increasingly important to find alternative sources of energy. While one solution is to create new sources of energy to add to the current energy capacity, another solution is to forego the use of energy (i.e., conservation) to return the foregone amount back into the energy market. Within the past few years, utilities have implemented what are called "demand response" (DR) programs, where customers agree to lower their power demand in exchange for a fee, a reduced power rate, or other forms of incentive to forego the use of energy during peak demand periods to give more capacity back to the utilities to meet demand.

An existing demand response system typically includes a control/dispatch center that monitors load characteristics of a consumer (e.g., commercial, industrial, or residential load source). When a peak demand period is detected, the control/dispatch center sends a control signal to load sources at the demand response sites (i.e., consumer sites that have agreed to a demand response program) to "turn down" the energy consumption. The typical control signal is a shut-down command to turn off various energy loads at the demand response site. However, one disadvantage of existing demand response systems is that the demand response is implemented on a reactive basis. That is, during a peak demand period, the control/dispatch center shuts off various energy loads based on whether specific preconditions are detected. Only then, the control/dispatch center sends control signals to the various loads to balance the load on the grid. Another disadvantage of existing demand response systems is that each demand response capacity is managed on an individual basis. When a peak demand is detected, the control/dispatch center shuts down individual load sources until the load on the grid is balanced. In other words, the demand response capacities from each consumer are not viewed as a total energy capacity but rather as individual capacities being returned back to the utilities.

One reason is that, in recent times, the power industry has been rapidly changing with the advent of deregulation as well as other socioeconomic factors. As a result, increases in efficiency and control of power generation costs are becoming of more importance. To meet the industry needs, a large number of siloed information technology (IT) applications have been introduced. However, these applications are typically not built with integration in mind with each application being too proprietary in nature and specifically tailored for a particular power generation operation. Accordingly, collection and integration of data from these applications and systems are extremely difficult outside of the intended operation. Many utilities have sought to create a large scale data warehouse to solve this integration problem.

Another difficulty with prior art systems is the disparate number of locations even within the organization that need access to the data. For example, within a power company, traders on a central trade floor, plant personnel at each power plant, engineers stationed regionally, management dispersed throughout the organization, and third parties all need access to the data in some form. The traditional siloed applications are typically client-server based applications and it is difficult to provide access to everyone in need of the data.

In addition, due to the generally isolated nature of the prior art systems as described above, combining qualitative event type data (e.g., real-time or recorded plant operations data) and quantitative data (e.g., Supervisory Control and Data Acquisition (SCADA) and market data) becomes difficult and cumbersome, if not impossible, due to the size and disparity of the data. On the other hand, such information is important in determining proper operation of power generation as back office settlement activities determine penalties associated with under or over production of power, for example. Typically, back office personnel manually extract data from a number of different IT systems in the organization to determine the activities that occurred in prior reporting periods. Many times, logs maintained in word processing or hand written documents must be searched manually.

Moreover, when a type of report is required, IT developers have to develop some level of custom code to extract data from the data and format the data properly onto a report. This task becomes even more complicated when disparate data sources with varying data formats are used.

III. SUMMARY OF THE INVENTION

Accordingly, the present invention relates to a system and method for collecting demand response customer data, aggregating, managing, and monitoring distributed demand response capacities that substantially obviates one or more problems due to limitations and disadvantages of the related art.

An object of the present invention is to provide a system and method to facilitate increasing power capacity to a power grid by providing aggregated power reduction at the demand resources (i.e., demand-side solution). Demand response is a form of distributed generation that lowers or balances load on the grid by reducing demand from large commercial and industrial users. In other words, in demand response, the demand resources (e.g., large commercial and industrial users) may be seen as micro-generators that generate power by giving power back to the grid by reducing demand. The system and method of the present invention supports aggregation, monitoring, and management of demand response resources as a form of distributed generation.

Another object of the present invention is to provide a system and method to help utilities aggregate, manage, and monitor distributed demand response capacities. The invention comprises a software system that allows a utility to aggregate, manage, and monitor distributed demand response capacities as larger, more manageable assets within the power markets on at least a daily basis; moreover, the invention also provides features for communication between the wholesale utility and the owner, manager, or administrator of the demand response load source. As wholesale power companies and utilities contract with energy consumers for the rights to reduce the consumers' energy load (herein referred to as "demand response program"), the present invention manages and tracks the key information about the load capacity, availability, and load source characteristics. This information is then coupled with weather forecast information, price, congestion, and other related market data to produce at least daily models describing how the individual, distributed, demand response programs will be aggregated in order to maximize overall system performance; all of this information is then made available in at least a summary, report-type format, for use by portfolio managers accessing the present invention via an instance customized for the wholesale power company or utility. According to this model, the distributed demand response programs are aggregated into larger blocks of energy products that a wholesale power company may choose to utilize, trade, and leverage in the market.

Once the model is established, the demand response program participants would then be notified of the plans of a portfolio manager of a wholesale power company via the system of the present invention. The demand response program participants would then use the system for monitoring their performance in the market, as well as a communications tool for transmitting and receiving messages to and from the wholesale power company's portfolio managers. The system also provides the capability to communicate with the utility's energy management systems (EMS) to automate and rapidly transmit information, about what assets have been identified as part of each energy block, to real time SCADA systems that are responsible for controlling generator operations.

Yet another object of the present invention is to provide a system and method for monitoring distributed demand response programs that substantially obviates one or more problems due to limitations and disadvantages of the related art.

Still yet another object of the present invention is to provide a system and method for collecting distributed demand response data from disparate data sources and generate a report of the performance of the operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a database to store demand response data, the demand response data including demand response agreement parameters, demand response load and energy demand characteristics of one or more demand response customers, the demand response load characteristics including power consumption capacity of each of one or more demand response loads, an aggregator to aggregate the demand response loads based on the demand response data and forecast data into a demand response portfolio, a monitor to monitor power demand of one or more demand response customers and one or more power grids, and a dispatcher to notify the one or more demand response customers of the demand response portfolio and to notify a utility of a response from the one or more demand response customers whether to control the demand response load to return the power consumption capacity of the demand response load back to the one or more power grids.

In another aspect, a computer-implemented method includes collecting demand response data, the demand response data including demand response agreement parameters, demand response load and energy demand characteristics of one or more demand response customers, the demand response load characteristics including power consumption capacity of each of one or more demand response loads, aggregating the demand response loads based on the demand response asset data and forecast data into a demand response portfolio, monitoring power demand of the one or more demand response customers and one or more power grids, notifying to one or more demand response customers of the demand response portfolio, and notifying a utility of a response from the one or more demand response customers whether to control the demand response load to return the power consumption capacity of the demand response load back to the one or more power grids.

It is to be understood that both the foregoing general description and the following detailed description are exemplary and explanatory and are intended to provide further explanation of the invention as claimed.

IV. BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 16A and 16B show exemplary embodiments of a daily report interface in accordance with the present invention;

FIGS. 17A and 17B show exemplary embodiments of a unit performance report interface in accordance with the present invention;

FIG. 20 illustrates an exemplary event log interface in accordance with the present invention; and FIGS. 21A and 21B illustrate an exemplary real time monitor in accordance with the present invention.

V. DETAILED DESCRIPTION OF THE EMBODIMENTS

General Description

Figure 1:
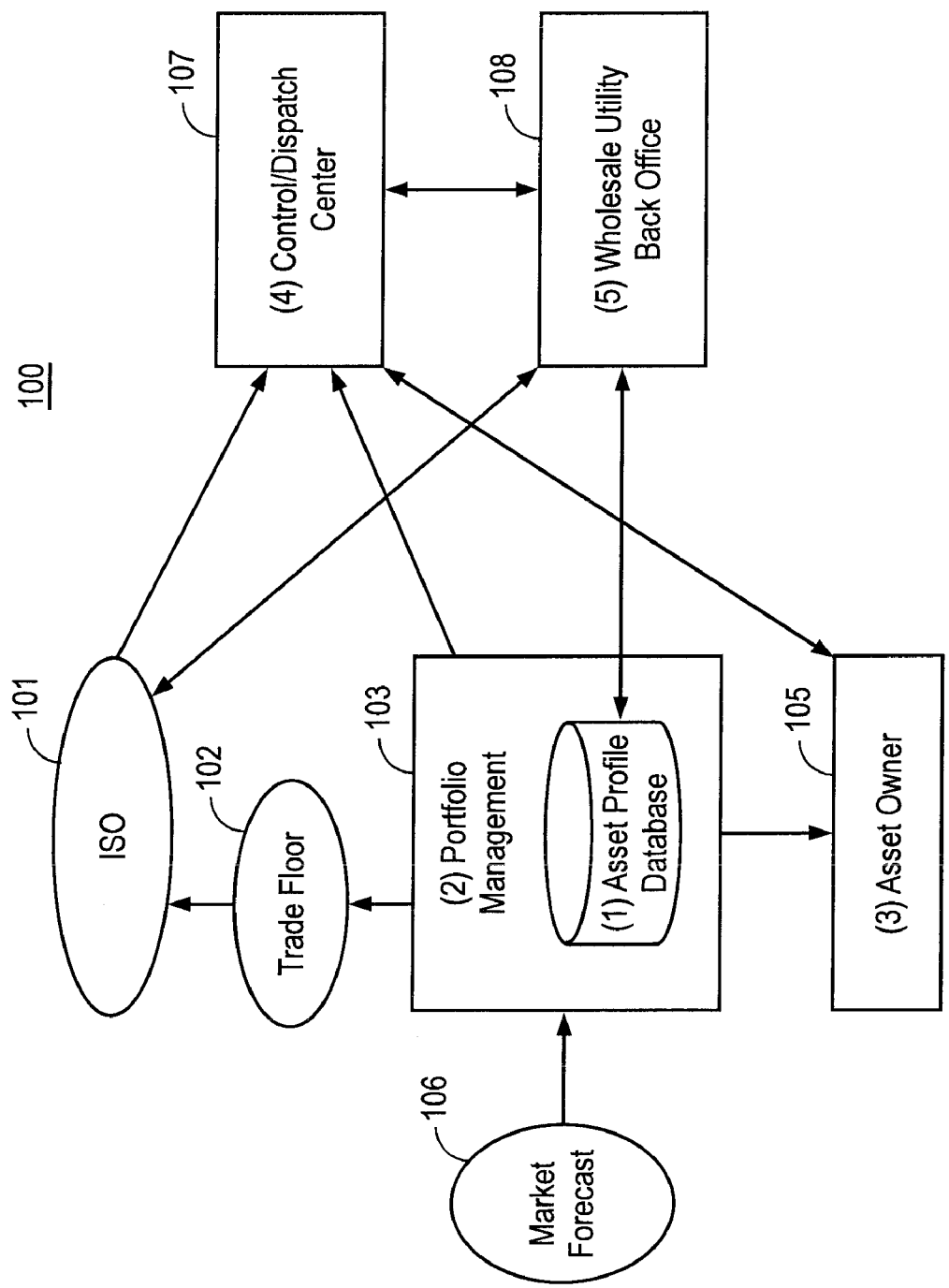
FIG. 1 shows a block diagram illustrating an overall system architecture of an exemplary embodiment of the present invention.
Figure 2:
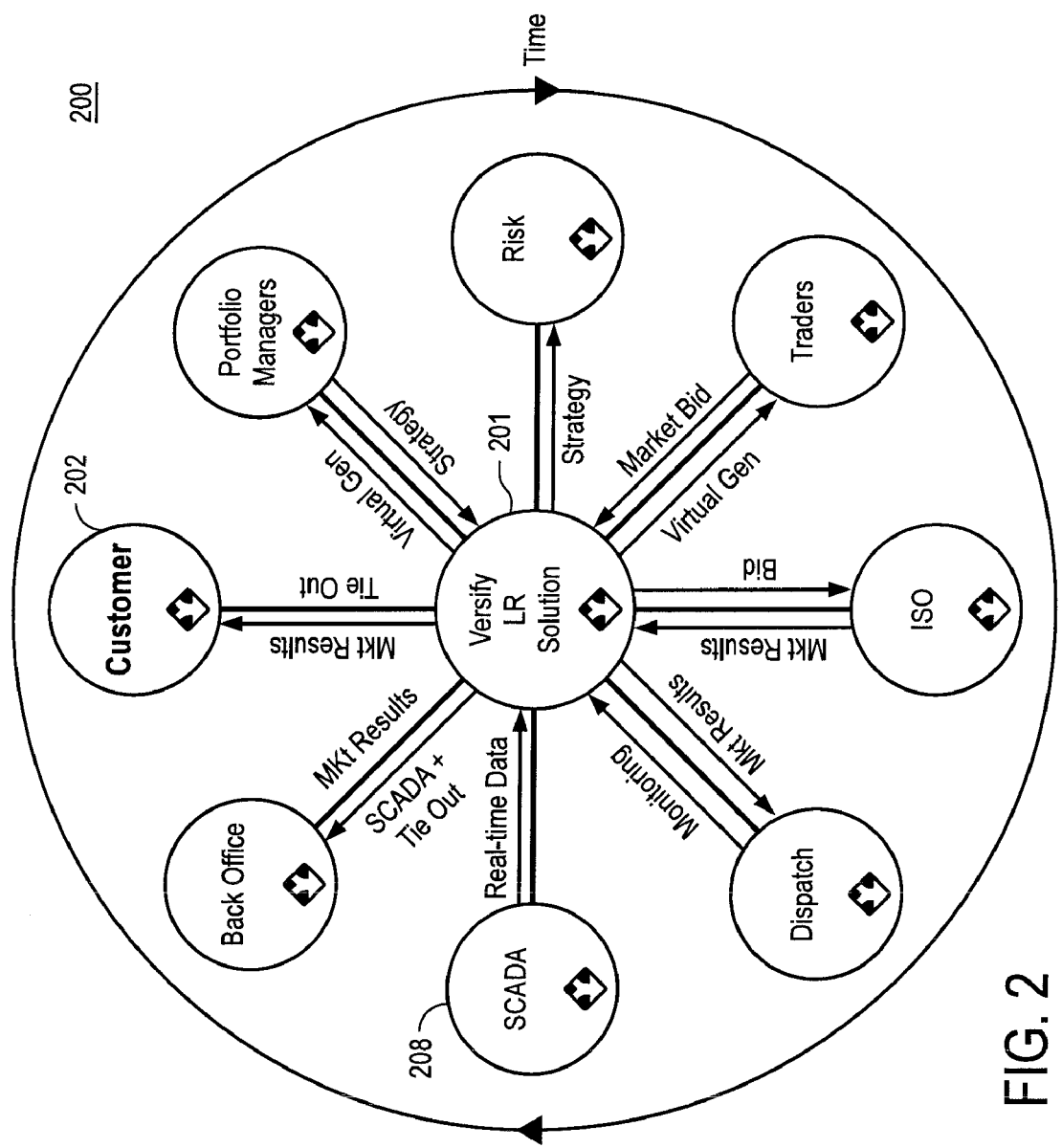
FIG. 2 shows a block diagram illustrating the overall high-level interactions among the various entities that interface with the present invention.

The invention generally encompasses systems including:

a database to store demand response data, the demand response data including demand response agreement parameters, demand response load and energy demand characteristics of one or more demand response customers, the demand response load characteristics including power consumption capacity of each of one or more demand response loads; an aggregator to aggregate the demand response loads based on the demand response data and forecast data into a demand response portfolio;

a monitor to monitor power demand of one or more demand response customers and one or more power grids; and a dispatcher to notify the one or more demand response customers of the demand response portfolio and to notify a utility of a response from the one or more demand response customers whether to control the demand response load to return the power consumption capacity of the demand response load back to the one or more power grids.

In certain illustrative embodiments the demand response data includes geocodes for each of the one or more demand response loads.

In certain illustrative embodiments the forecast data includes operational data, market data and weather data.

The invention generally encompasses methods including:

collecting demand response data, the demand response data including demand response agreement parameters, demand response load and energy demand characteristics of one or more demand response customers, the demand response load characteristics including power consumption capacity of each of one or more demand response loads;

aggregating the demand response loads based on the demand response asset data and forecast data into a demand response portfolio;

monitoring power demand of the one or more demand response customers and one or more power grids;

notifying one or more demand response customers of the demand response portfolio; and notifying a utility of a response from the one or more demand response customers whether to control the demand response load to return the power consumption capacity of the demand response load back to the one or more power grids.

In certain illustrative embodiments the demand response data includes geocodes for each of the one or more demand response loads.

In certain illustrative embodiments the forecast data includes operational data, market data and weather data.

Reference will now be made in detail to the embodiments of the present invention, examples of which are illustrated in the accompanying drawings.

The system of the present invention would be employed at a centralized location using one or more database and web application servers. Each wholesale power company (e.g., utility) would have a centrally managed system comprising web applications and databases. Employees at the wholesale power company could access the data of the present invention through a web-based user interface. As one or more deals/contracts are made between a wholesale power company and a demand response program participant, deal and load details are added to one or more of the system's databases. The details include individual load response agreement parameters and load characteristics at the participant's site. Each of the energy load parameters are geocoded, for example, so that the demand response programs may be aggregated based on geographic location.

Once the demand response programs are collected, the system of the present invention aggregates the load response programs to help manage the load portfolio on a macro basis. After aggregating the demand response programs based on one or more criteria (e.g., usage, capacity, schedule, price, etc.), the system of the present invention simulates what demand response loads to use based on forecasted weather, price, congestion, and related market data. The demand response load analysis may be performed for any time period based on the available data. For planning purposes, the demand response load may be analyzed for the next day. Analysis for the next day market data may include price, overall system load, weather, system constraints, historical usage patterns, and other parameters.

The system of the present invention then determines (e.g., assigns) which demand response loads will make up each block of power to be bought and sold into various power markets. As a demand response loads are identified for use, the demand response load owner is alerted through the system that the owner's load will be reduced. Demand response load owners could then use the system to review past, current, and future plans for their demand response loads, alert the wholesale power company as to any issues or problems, and monitor usage. The system then makes performance reports available to the DR load owner and the wholesale power company; the performance reports comprise detailed usage data, cost data, and revenue data. The system then transmits data to the wholesale power company's other internal operations, management, analysis, settlement, or other systems, if necessary. For example, planned/scheduled usage data is sent to energy management systems (EMS), risk analysis applications, and back office settlement systems.

The present invention's reporting and notification software (described below) is centered with respect to planning, operational, and settlement activities associated with the demand response programs. For example, the reporting and monitoring features of the present invention include review of real-time demand response programs on a macro and micro level, after-the-fact reporting of demand response transactions, market settlement reporting around demand response programs on a macro and micro basis, and analysis of the demand response load usage patterns on a macro and micro level. From a control/dispatch perspective, the system of the present invention includes logging tools to automatically log demand response events, GIS reporting capabilities, notification capabilities to notify the demand response participants, and approval process and workflow to approve demand response activation.

In one embodiment of the system, as shown in FIG. 1, the system 100 is comprised of: (a) an Asset Profile Database (a database of the demand response loads and their characteristics, demand response agreement parameters, availability characteristics, GIS encoding of the loads, etc.); (b) a Portfolio Management Application 103 (incorporates market forecast data and historical data, and analyzes the market opportunity in conjunction with the Asset Profile Database to determine market trading strategies); (c) an Asset Owner Application 105 (also referred to as a Demand Response Application) (to facilitate management, usage, and communications with demand response load owners); (d) a Dispatch/Control Center Application 107 (for real-time monitoring of asset performance, automatic dispatch log, communication of trading activities, and asset availability); and (e) a Wholesale Utility Back Office Application 108 (records asset usage and tie and settlement data, and provides asset reporting via dashboard reports and drill down data systems, and includes P&L).

Figure 3:
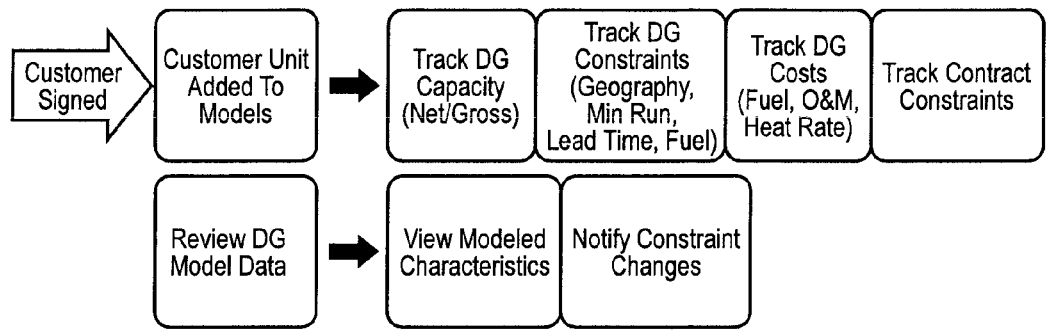
FIG. 3 shows a block diagram illustrating the asset profile database: customer signed decomposition flows.

The Asset Profile Database, as shown in FIG. 1, is initialized for storing data once a demand response program participant (e.g., demand response load owner) has signed a contract with a wholesale power producer. The terms of the contract (e.g., allowed usage, minimum run, lead time/scheduling, price, cost, capacity, and other load response agreement parameters) as well as details regarding the customer's assets (e.g., physical characteristics of the demand response load, such as load capacity, etc.) are added to the system and to the database. The participant then has access to their own data, and may verify and identify any discrepancies. FIG. 3 illustrates the operations of this process in the asset profile database: customer signed decomposition flow 300.

Figure 4:
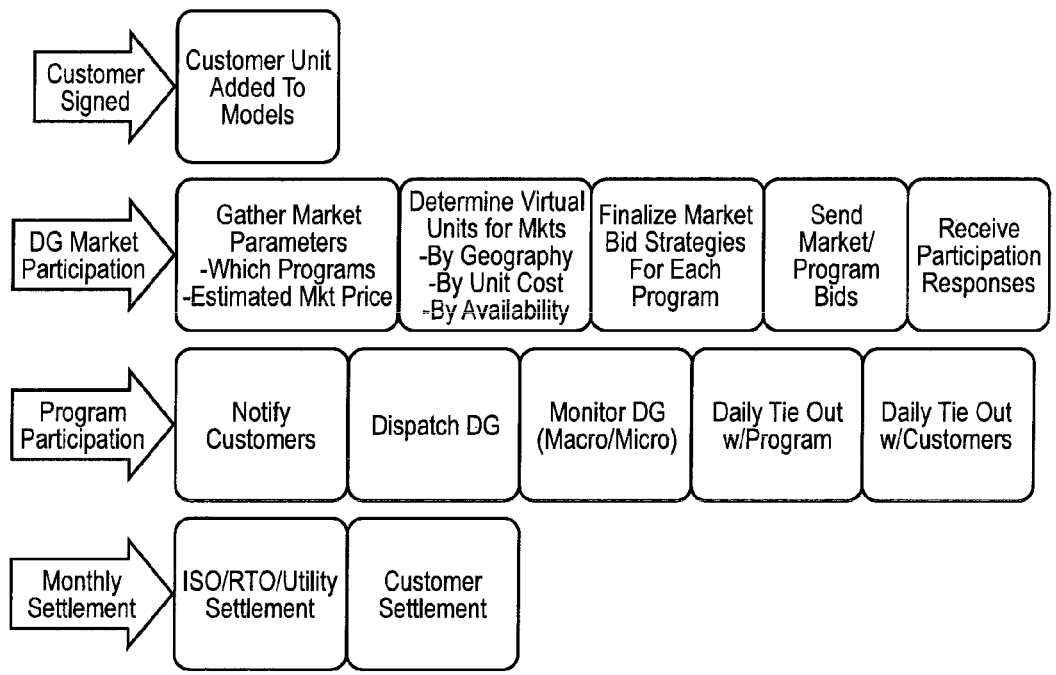
FIG. 4 shows a block diagram illustrating a high-level summary of the portfolio management application flows.

The Portfolio Management Application 103, as shown in FIG. 1, is a centralized application used by portfolio managers at a wholesale power company or utility to plan usage of and monitor the aggregated demand response loads in a number of power markets; it is also a customer-based reporting tool, directed towards DR load owners, that continuously monitors the demand on the system and sends notifications to DR load owners regarding planned usage, as well as report on real-time and after-the-fact demand response programs on a macro and micro level. In order to perform the monitoring function, the Application 103 connects to each demand response load network management system, or other accessible database, and retrieves the appropriate information regarding status, usage, load, capacity, or other characteristics of the demand response loads. Once the data is retrieved, it is stored and analyze according to the various reporting capabilities available in the present invention (as described below). At such time, a wholesale power producer (e.g., Wholesale Utility Back Office 108) and DR load owner (e.g., Asset Owner 105) may access the summary and reporting features to receive the respective monitoring data. The Portfolio Management Application 103 is used by wholesale power companies/utilities to track each demand response program under management. It may also serve as a central warehouse for DR load data, and as a planning engine that a portfolio manager could use on a daily basis to optimize DR load usage based on the manager asset mix and current market conditions. FIG. 4 illustrates the high-level business processes 400 that are addressed by the Portfolio Management Application 103.

The system 100 of the present invention includes key planning and modeling activities, which allow a portfolio manager to model, optimize, and plan usage for an entire portfolio of demand response loads, within market parameters. A portfolio manager may utilize a DR load one way on a given day to produce a product highly valued by that day's market, and in an entirely different manner the next day, according to new market conditions. Furthermore, within these planning functions, the portfolio manager will also be able to add value to existing large scale power generators by offsetting peak demands by activating the DR loads.

Figure 5:
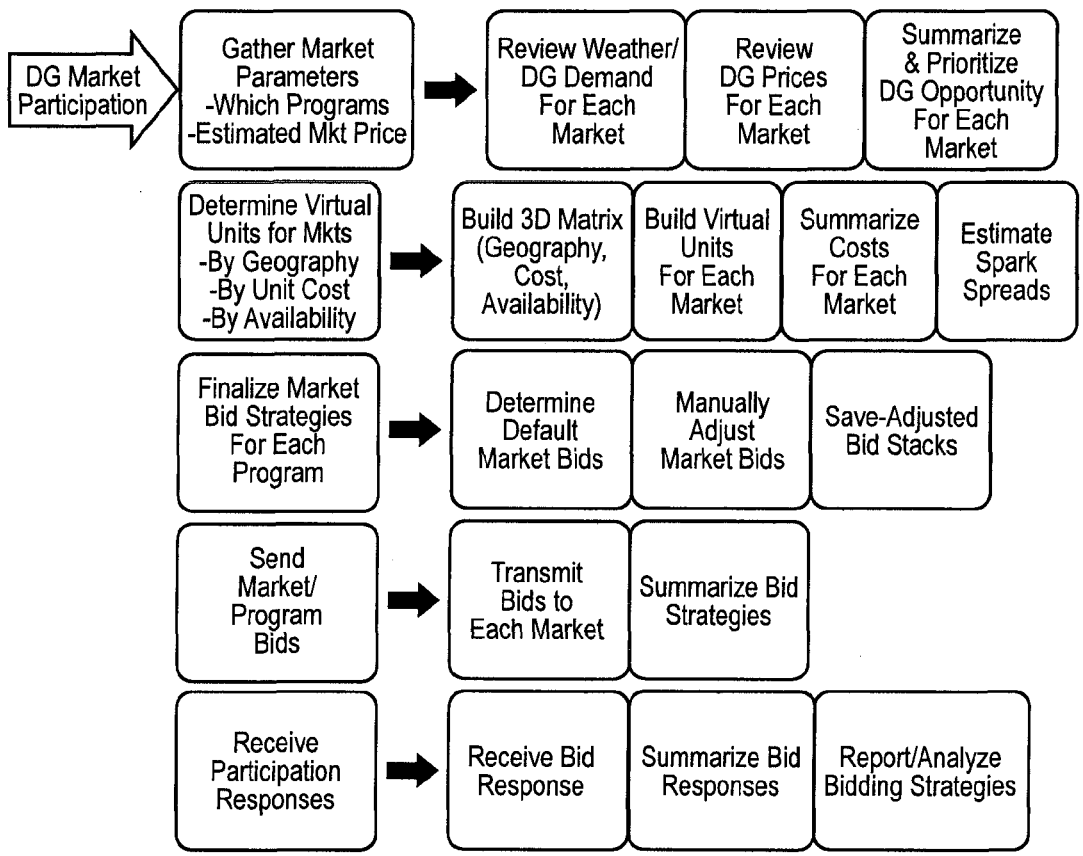
FIG. 5 shows a block diagram illustrating the portfolio management: market participation flows.
Figure 6:
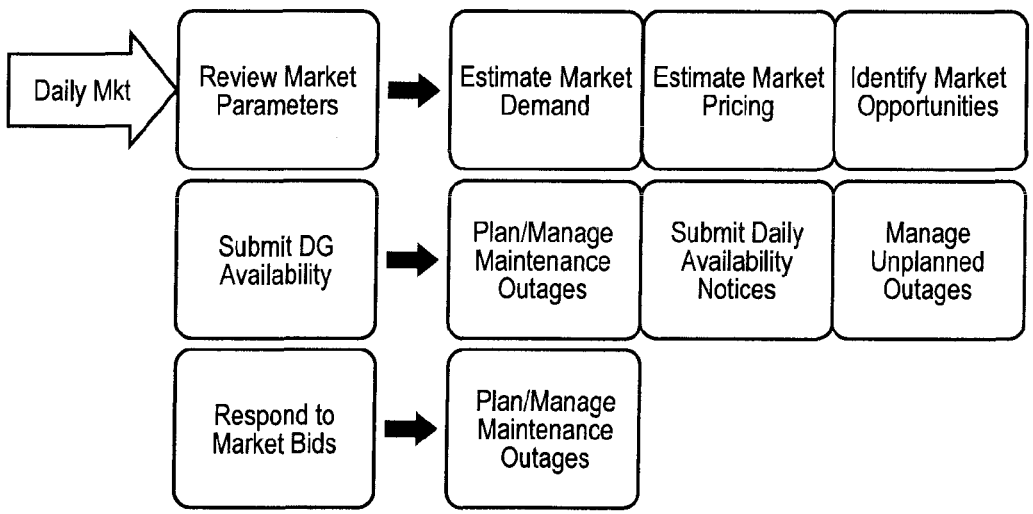
FIG. 6 shows a block diagram illustrating the portfolio management: daily market operations flows.

As briefly described above, a portfolio manager at the wholesale power company may utilize the system 100 of the present invention to plan market participation for the current and next day. The portfolio manager is considered an expert on power markets and has key insight into where market opportunities lie (i.e., both geographically and from a power product perspective), and understands the wholesale power company's current risk portfolio. The portfolio manager enters key market parameters that describe where market value may lie into the portfolio management application 103 of the system. The system then analyzes the entered market parameters, as well as each available demand response program, to develop a model of how the available assets can be utilized to maximize profit and/or meet demand; this model is then communicated to the portfolio manager, or other system user, via the user interface or reporting features of the present invention. The demand response programs are combined or "aggregated" by the system into larger, manageable "virtual" assets that the portfolio manager may then trade into each market. For example, the portfolio manager may see value in a capacity market in a particular geographic region based on market and weather conditions. After analyzing all of the available demand response programs according to agreement parameters, load characteristics, and other conditions, the system may suggest to the portfolio manager the allocation of, for example, 150 distributed demand response loads in the geographical region into a tradeable chunk of capacity. The portfolio manager may accept the suggestion, or alter it in some way (perhaps returning 20 of those assets back to the asset pool and only trading capacity from 130 assets). These plans may be communicated to each participant (e.g., demand response load owner) who owns a demand response program that is included in the plan presented to the portfolio manger (typically, via the Customer Application 202, described below). Participants may have the ability to opt in our out of a particular plan depending on the participant's needs for that day. Once all of the plans are finalized (there are multiple power products, and multiple geographic regions that may be traded), the system develops bids and offers to be sent into each market, for buying and selling energy products as desired. The system will receive the market results as bids and offers are accepted. The Portfolio Management Application a 103 allows the portfolio manager to manage market operations and portfolio decisions on a daily basis. FIGS. 5 and 6 illustrate the operations of this portfolio management process in the decomposition flows 500 and 600, respectively.

The Asset Owner application 105, as shown in FIG. 1, is targeted towards each demand response program participant who contracts with a central utility in order for the utility to leverage and manage use of the DR loads. The application is the key communications tool between the asset owner (i.e., demand response participant), the portfolio managers, and the dispatchers at the utility. The application automates and optimizes communications between the asset owners and the wholesale power company 108, over the system. The application allows asset owners to view conditions about the usage of their assets, and monitor dispatch activities in real-time while allowing communications with the Control/Dispatch Center.

An asset owner communicates any availability information to the central database on a daily basis. Unless otherwise notified, the system assumes the DR load is available per usage according to the contract. If for some reason a DR load is unavailable for demand response control, the asset owner uses the system to notify the utility. Also, when an asset owner's DR load is included in the same day's energy plans, the owner is notified via the customer application. Depending on the contract, the DR load owner may opt in or out of that day's activities.

The Control/Dispatch Center Application 107, as shown in FIG. 1, provides real-time monitoring capability so that a control center can manage the demand response in real-time. Dispatchers have access to real-time and historical data about the demand response loads. A dispatch login application also provides dispatchers an ability to log dispatch events for record keeping purposes.

Figure 7:
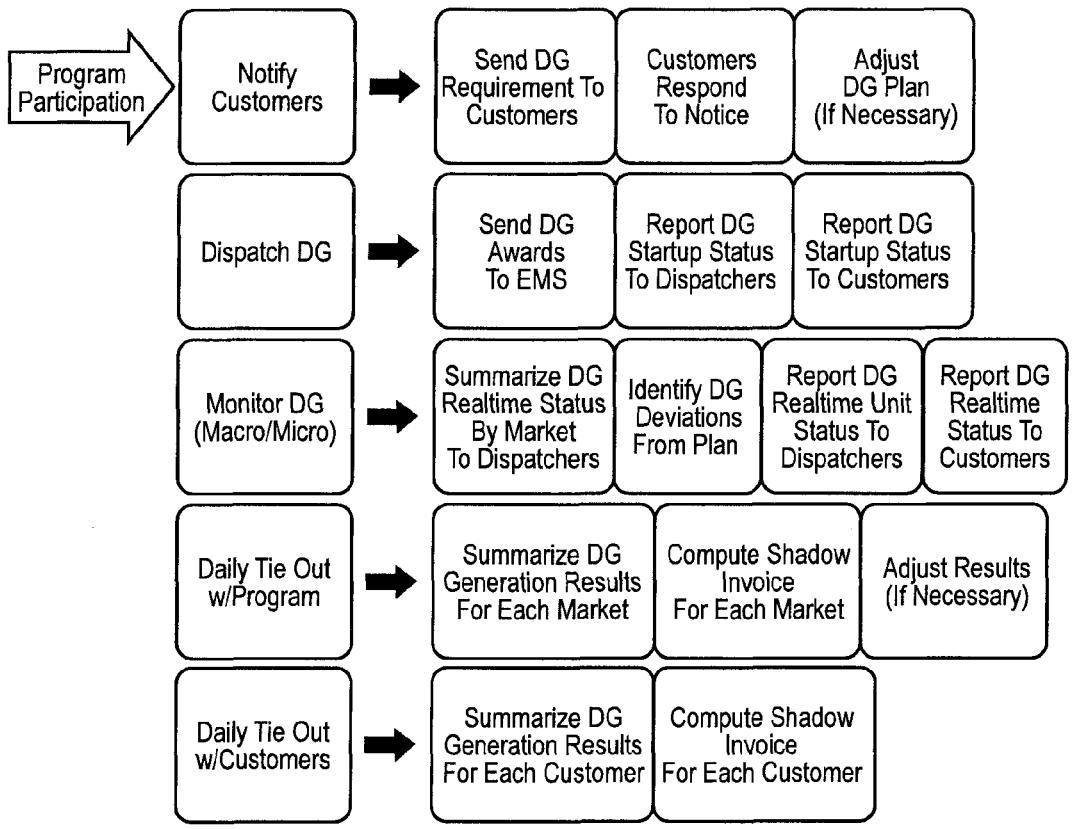
FIG. 7 shows a block diagram illustrating the control/dispatch center application: program participation flows.
Figure 8:
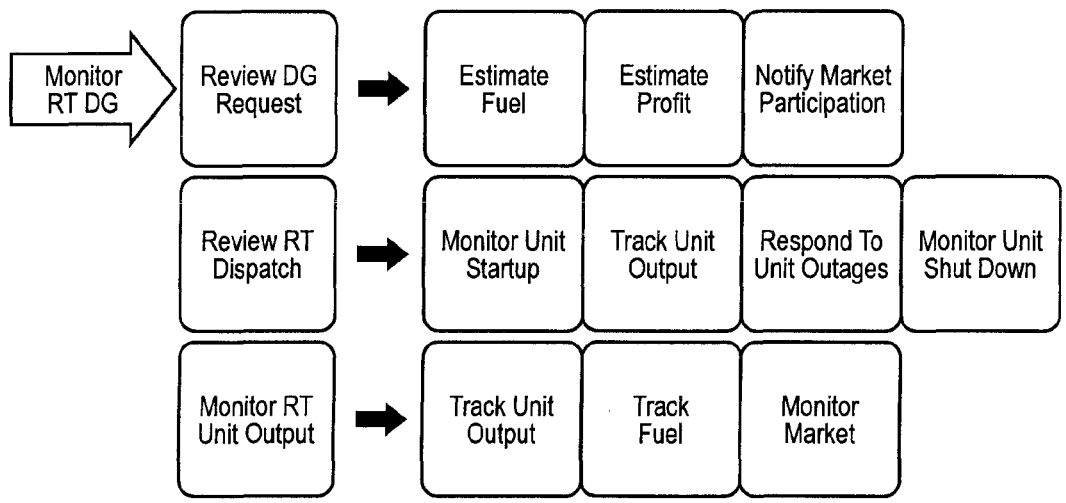
FIG. 8 shows a block diagram illustrating the control/dispatch center application: monitor real time operations flows.

The Control/Dispatch Center Application 107 also includes a program participation capability. When bids and offers are accepted, the wholesale power company is committed to producing the power products that have been bought and sold. The system 100 of the present invention, specifically, the program participation capability, notifies DR program participants of the DR loads to be utilized and the plan for their utilization. The system also notifies the wholesale power company's Energy Management System (EMS) of each resource and its allocation plan; the EMS is responsible for the actual operation (i.e., activation/deactivation) of the DR loads according to the plan. The system will monitor Supervisory Control and Data Acquisition systems (SCADA) 208 and provide reports that allow portfolio managers and dispatchers to monitor the operation of each block of energy (or other product). The dispatcher or portfolio manager may drill down in each report to the asset level in order to monitor activity in greater detail. Due to the disparate location of the distributed demand response loads that comprise a product block, a GIS user interface may be utilized to present large amounts of data via a simple-to-use user interface. Once the plan has been executed, the data is archived for reporting purposes. The reporting feature of the present invention, as applied to this application, includes: (a) high-level reporting to settle with the markets in which the power was traded; and (2) reporting for each demand response program participant that will need information to settle the contract with the utility. FIGS. 7 and 8 illustrate the operations of the control/dispatch center application process in decomposition flows 700 and 800.

Furthermore, a Monitor DT capability is also provided. Once an asset has been allocated for use, and its plan is communicated to the wholesale power company's EMS, the unit is initiated remotely by the EMS. The DR load owner is then able to monitor unit output via the Customer Application 202. The Application 202 is linked to the central SCADA system 208 that monitors usage for all generators and demand response loads controlled and operated by the EMS. Reports are then generated from the stream of SCADA system data and communicated to the DR load owner in a near real-time basis. Some of the data presented in the reports includes: mW reduced, fuel data, emissions, and other key operational data.

FIG. 1 also shows the Wholesale Utility Back Office Application 108. This application 108 is a back office-type application that manages a database of asset transactions for record keeping and reporting purposes. The reports generated are available for access by wholesale power producers and demand response program participants, in accordance with appropriate privileges.

Figure 9:
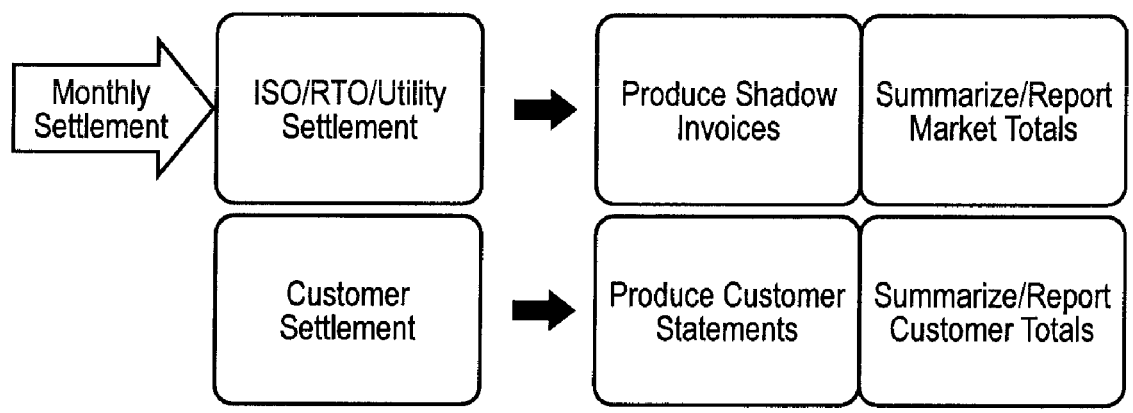
FIG. 9 shows a block diagram illustrating the back office application: settlement flows.
Figure 10:
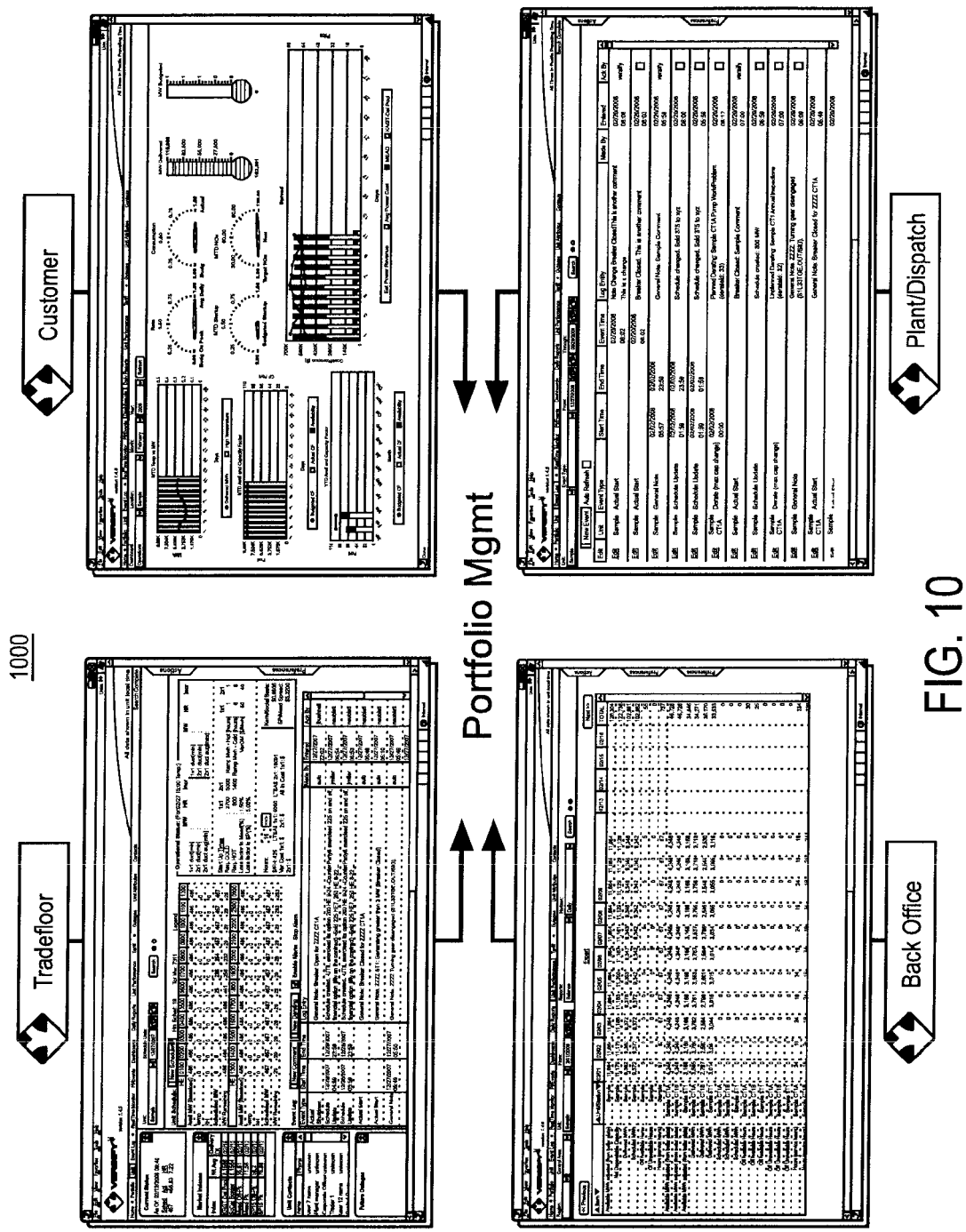
FIG. 10 shows screen captures illustrating the user interfaces that the various entities use for portfolio management in accordance with the present invention.

As stated above, there are two levels of settlement: ISO market settlement, and each participant's own contract with the utility. The system of the present invention produces shadow settlement reports for use in back office invoice reconciliation. In addition, dashboard and other reports are also available via the customer application to help in contract settlement. FIG. 9 illustrates the back office application: settlement processes decomposition flow 900.

A system and method of a feature of the present invention is a flexible solution both in terms of the type and amount of data processed and in terms of monitoring and reporting to the above identified problems of the prior art. In general, a system and method of a feature of the present invention is a hosting asset performance monitoring and reporting tool used by owners/portfolio managers of power generators, such as independently owned utilities, municipalities, and cooperatives, as well as participants of distributed demand response programs, for example. It is to be understood that other users and benefits may be realized without departing from the scope of the invention.

Another feature of the present invention provides, for example, dashboard reporting (e.g., for management-level), summary/drill-down reporting (e.g., back office processing), daily operational reporting (e.g., operations), query interface for plant supervisory control and data acquisition (SCADA) information on ad-hoc basis, and near real-time status and logging capabilities. The reporting and monitoring capabilities in accordance with the present invention facilitates management and review of the demand response programs. Accordingly, the system and method of the present invention provides, for example, logged information created by automated plant and demand response monitoring systems and/or plant personnel as events occur with relative SCADA and market information. The details of this system and method of the present invention is described below.

Figure 11:
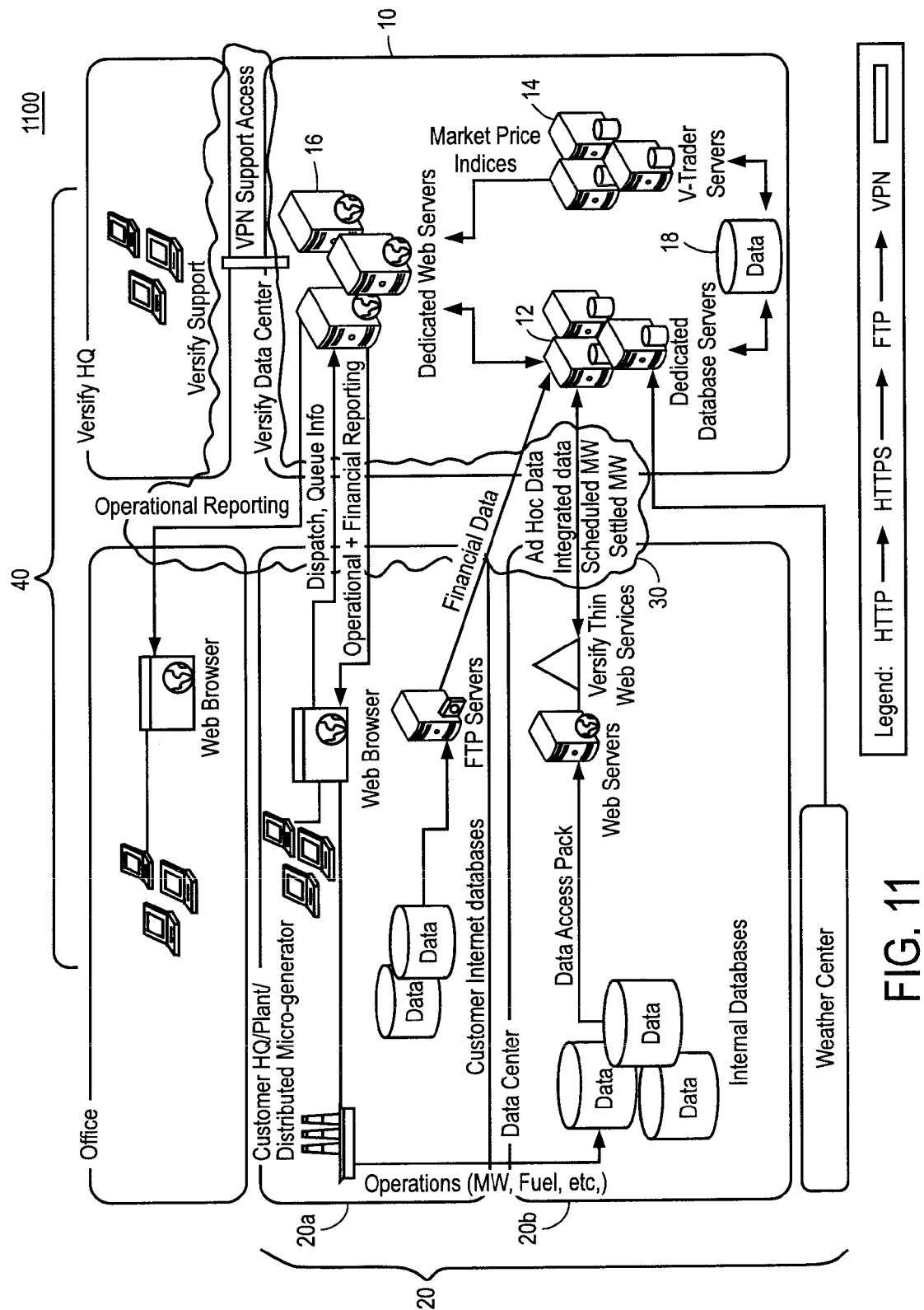
FIG. 11 shows a block diagram illustrating an overall system architecture of an exemplary embodiment of a monitoring and reporting feature of the present invention.

FIG. 11 shows a block diagram illustrating an overall system architecture 1100 of an exemplary embodiment of a monitoring and reporting feature of the present invention. As shown in FIG. 11, the system of this feature of the present invention includes a hosting monitoring center 10 in communication with a plurality of remotely located disparate data sources 20 over a communications network 30. The communications network may be any data communications network, such as point-to-point connections, local area networks (LAN), wide area networks (WAN), Internet, etc. and may be over a wired or wireless communication medium. The remotely located disparate data sources 20 provide qualitative information (e.g., events type data) and quantitative information (e.g., market data) related to a hosted power generating unit, and distributed demand response assets. For example, as shown in FIG. 11, the hosting monitoring center 10 may be in communication with a hosted distributed demand response assets 20a and SCADA data center 20b. SCADA data center 20b may be any data source that archives time-series SCADA or telemetry data of a power generator and distributed demand response assets, is sometimes referred to as SCADA historian, and tracks, for example, megawatts produced, fuel consumption, etc. Generally, SCADA data center 20b collects SCADA information from a plurality of power generations located within a defined region. However, any SCADA data source may be used without departing from the scope of the present invention. The hosted distributed demand response assets 20a provides internal operations data of the distributed demand response assets, such as operational event logs, the amount of power being generated, operational cost information (including unit design and budget data), etc. "Budget" data, as used herein, includes financial/cost expectations as well as operational expectations, such as expected hours of operation, expected number of starting the generators over a projected time frame, how much power is expected to be generated, etc. It is to be understood that the data provided by the hosted distributed demand response assets 20a may overlap with the information provide by the SCADA data center 20b and may be used independently of, or in conjunction with, each other. Other remote data sources may include market and financial information data services (not shown) that provide historic and real-time market information to the monitoring center 10.

The hosting monitoring center 10 includes power data server 12, market data server 14, and web server 16. It is to be understood that these servers may be implemented in a single machine or a plurality of machines without departing from the scope of the invention. The power data server 12 and market data server 14 are configured to obtain data from any number of the disparate data sources 20. The data sources 20 may be databases from hosted or non-hosted systems, such as independent system operators (ISOs), regional system operators (RSOs), distributed demand response assets, and SCADA data centers, for example. The data may also be obtained from internal data sources of hosted and non-hosted system, such as data from internal databases, spreadsheets, and other software packages. The power data server 12 and market data server 14 convert the collected data into a common format and store the transformed data in data store 18. The data store 18 may be a single or a plurality of data storage devices and may be implemented as a direct data repository or a relational database. Other data store configurations may be used without departing from the scope of the present invention. The web server 16 communicates with client devices 40 to provide monitoring functionality to the users. Client devices 40 may be workstations, notebooks, digital personal assistants, and other data-enabled devices. The web server 16 processes the requests from the client devices 40 and provides the requested information via reports and alarms to be described further below.

In an exemplary embodiment of the present invention, the web server 16 communicates with the client devices 40 via web-based applications. In the exemplary embodiment, the client devices 40 only need a web browser and do not require any specialized applications. The web server 16 includes a proprietary XML:HTTP callback architecture to initiate requests from a browser from the client device 40, for example, back to the web server 16.

Figure 12:
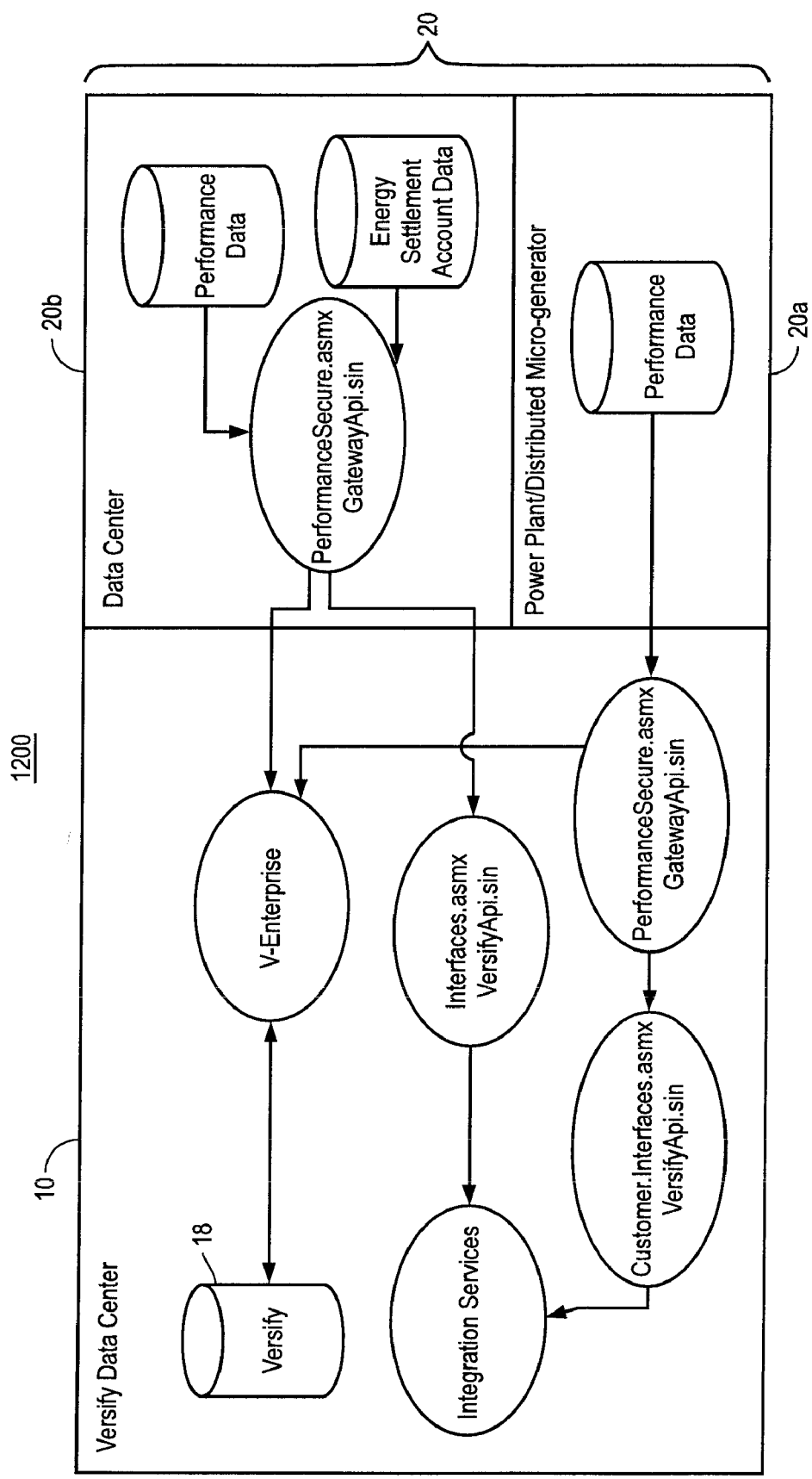
FIG. 12 shows a block diagram illustrating an exemplary embodiment of a communication interface architecture of the present invention.

FIG. 12 shows a block diagram illustrating an exemplary embodiment of a communication interface architecture 1200 of the present invention. As shown in FIG. 12, the system and method of the present invention extracts data from any number of disparate data sources 20 using a combination of web services and SQL server integration services. For example, the interface architecture in accordance with the exemplary embodiment of the present invention includes hosted GatewayAPI web service located behind the hosted system's firewalls, Hosting Interface API web service located behind the firewall of the web server 16 that communicates with the hosted GatewayAPI, and SQL server integration services that communicate with the interface web service, located on the data servers 12 and 14. It is to be understood that locations of the services and additional services may be used without departing from the scope of the invention.

The GatewayAPI in accordance with the exemplary embodiment of the present invention extracts data from the hosted system's internal applications. The GatewayAPI accesses known APIs of other commercial software systems and databases as well as any custom code needed to pull data from the hosted system's internal proprietary applications. In an exemplary embodiment, the GatewayAPI extracts data and returns the data to the web service client as either a ADO data set or XML document.

The Hosting Interface API in accordance with the exemplary embodiment of the present invention provides the ability to communicate with the Gateway API and contains interface logic to transform data into a common data format. The Hosting Interface API, for example, pulls hourly, snapshot, and market data into the data store 18. The Hosting Interface API also generates log events from SCADA information.

The SQL server integration services in accordance with the exemplary embodiment of the present invention drive the communication interfaces. The SQL server integration services utilize mapping data to execute, monitor, and report on scheduled interfaces for each hosted system. Thus, in accordance with the exemplary embodiment of the present invention, the SQL server integration services includes "retry" logic to ensure that data is not missed due to any sort of system failure.

Once the qualitative and quantitative information of the hosted power generating unit (e.g., distributed demand response assets 20a), the web server 16 of the hosting monitoring center 10 provides customized reports to the client devices 40 through report interfaces implemented on the web server 16. The report interfaces in accordance with an exemplary embodiment of the present invention are built from a customizable library of report interfaces. The report interfaces of the present invention are customized using extensible markup language (XML) based "config files" that contain information about what data to extract and how to format the data on a report interface. Accordingly, the XML config files in accordance with the present invention combine data from any number of disparate systems into a comprehensive report. The XML config files of the present invention simply map data from the data store 18 directly to a report interface without requiring any customized code.

Figure 13:
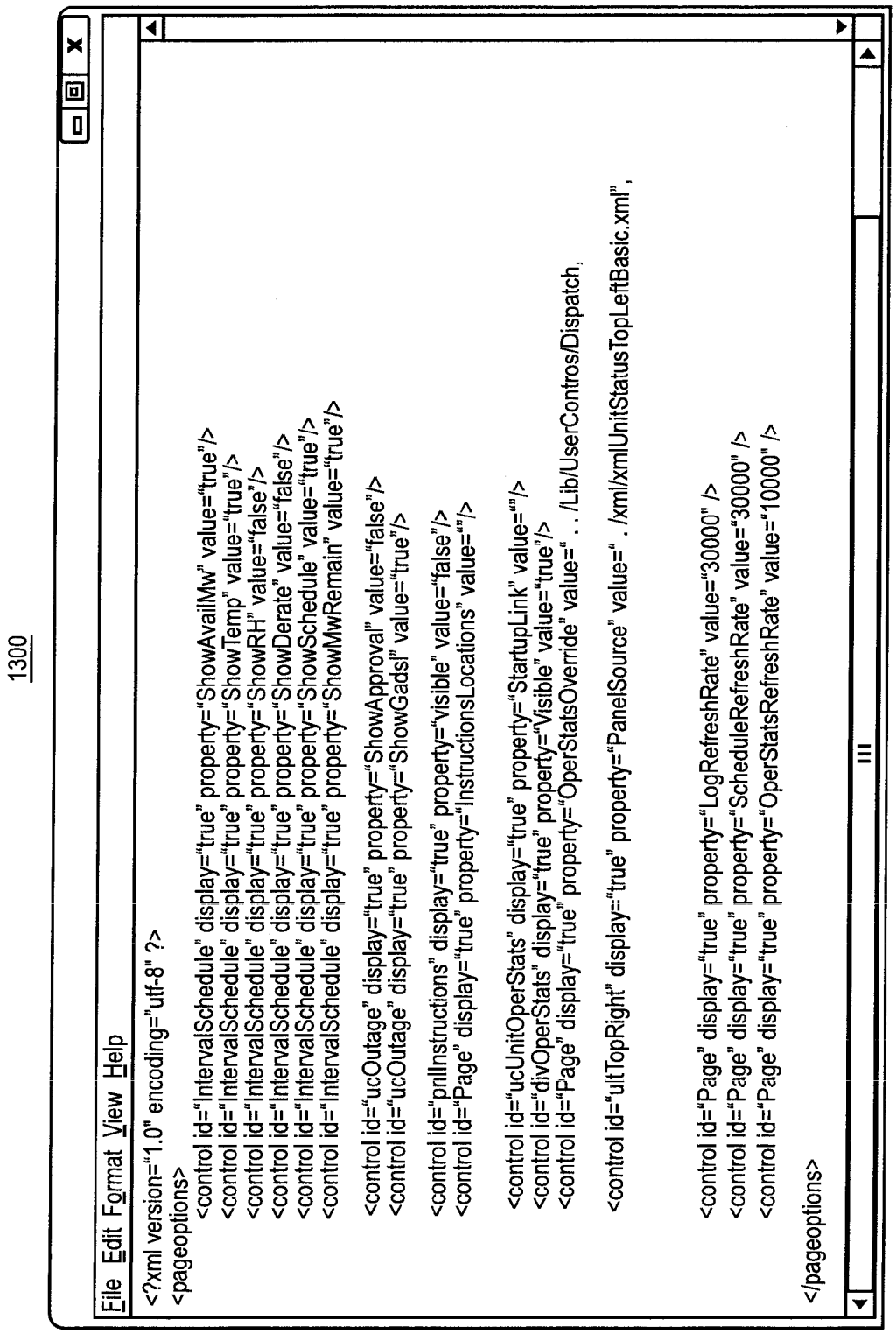
FIG. 13 is an example of a config file in accordance with the present invention.

An exemplary embodiment of the present invention includes page config files and reports config files. The page config file 1300, as shown in FIG. 13, includes XML that may direct the page to change any property of the page itself, or any property of any control on the page. This allows the user interface to be changed without writing any code and increases maintainability across multiple client devices 40. For example, when the page initially loads, the browser automatically looks for a page config file. If a page config file is found, the browser processes the XML for the page contained in the page config file. Each page or control property identified in the XML is then set based on the page config file setting. To illustrate, a button on the page may be hidden by setting the visible property of the button equal to hidden. Furthermore, properties have been created on certain pages such a unit status report interface, to be explained below, that allow customization of entire sections of the page through the use of custom user controls.

The reports config file defines the layout of a report interface using XML included in the reports config file. The reports config file includes XML fragments for each object to be displayed on the report interface (e.g., graph, pie chart, data table, etc.) The XML fragment includes information specific to the object being shown (e.g., location on report, height, width, colors, etc.) as well as mapping information back to the data store 18 as to what data should be displayed. There may be mappings to multiple stored procedures defined for a single report object. For example, a chart may pull hourly megawatt (MW) data from one stored procedure and hourly price information from another in conjunction with a reporting engine to be described below. In an exemplary embodiment, a reports config files may be defined for a single report but have different configurations depending on what hosted system (e.g., distributed demand response assets) the report is for. For example, each reports config file may have a "default" configuration defined. For any hosted system (e.g., distributed demand response assets) or unit (e.g., non-distributed/distributed generators) referred to as "locations," where the report is to have a different look and feel and/or different data source, a subsequent "override" XML fragment is defined for the location. Any location that does not have the override fragment reverts to the default layout.

Figure 14:
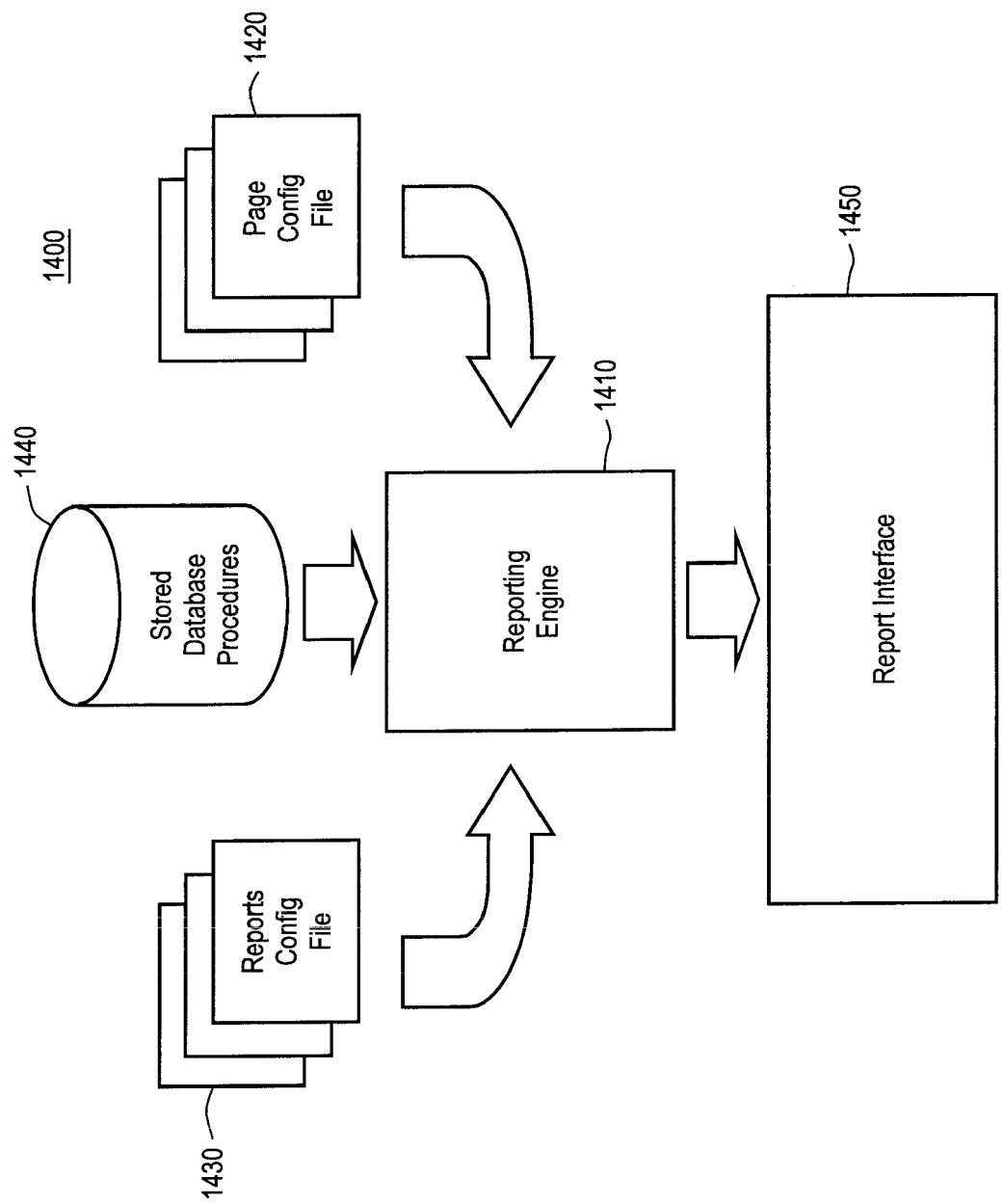
FIG. 14 shows a block diagram illustrating an exemplary embodiment of generating a report interface in accordance with the present invention.
Figure 15A:
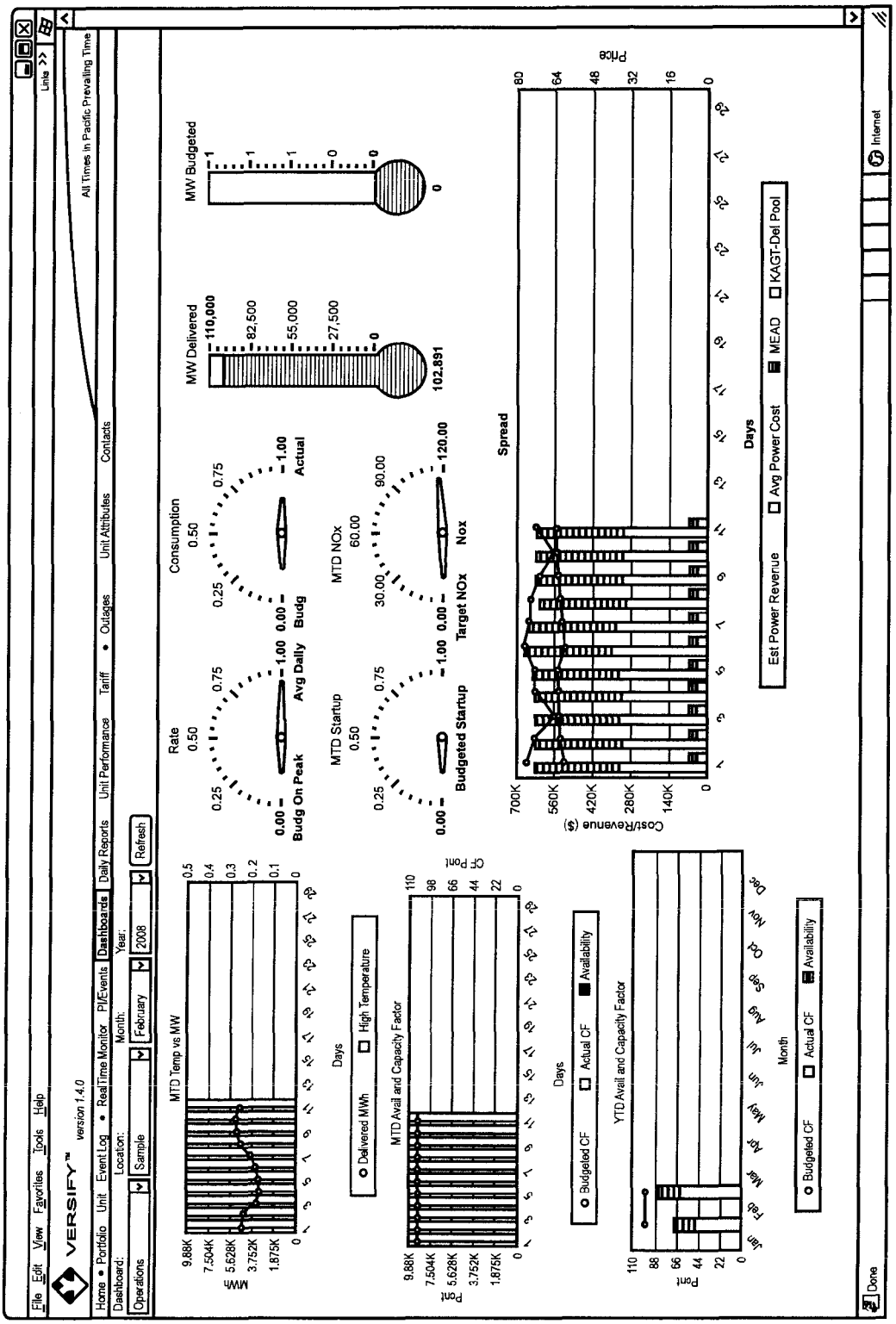
FIGS. 15A-15K show exemplary embodiments of a dashboard report interface in accordance with the present invention.
Figure 15B:
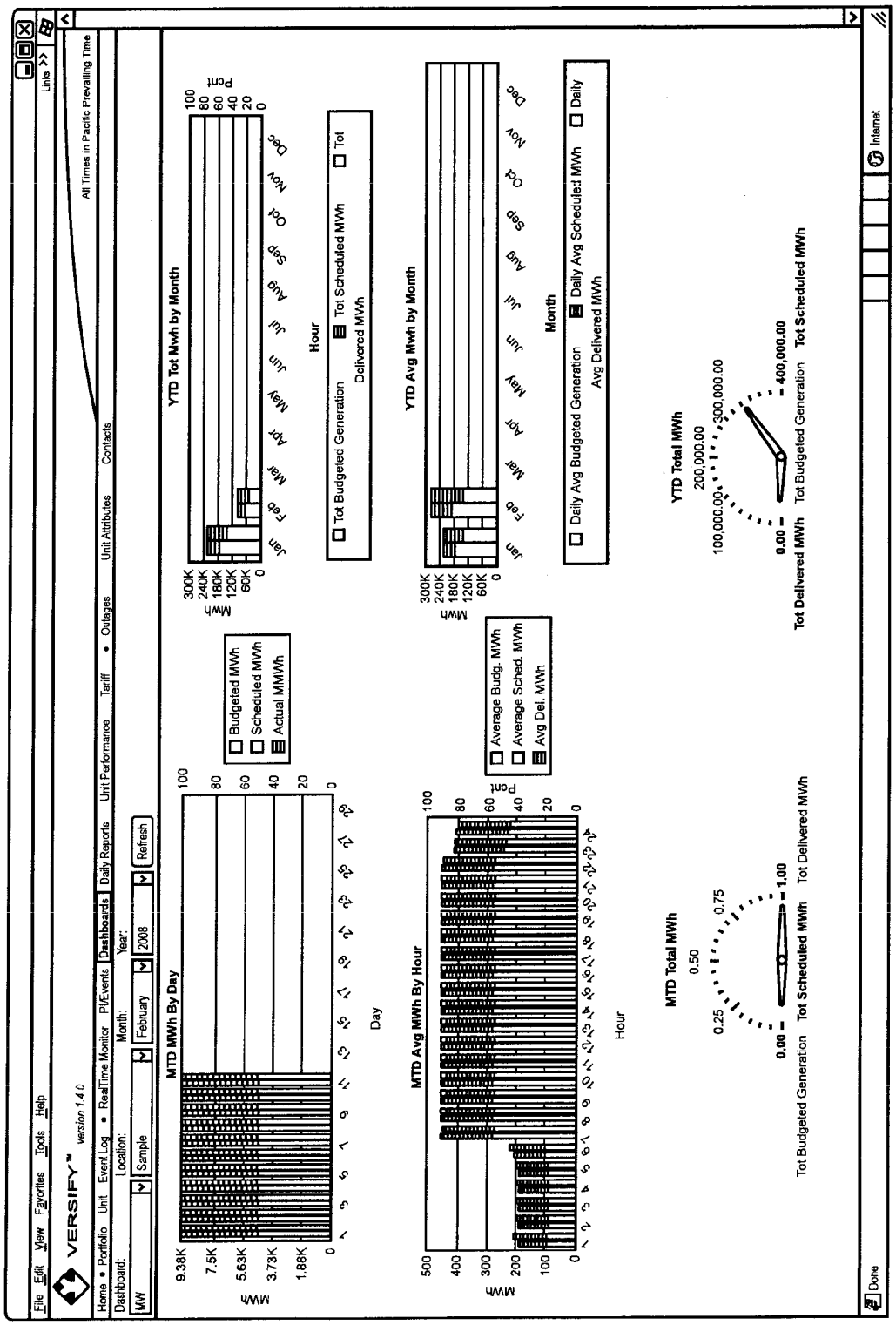
Figure 15C:
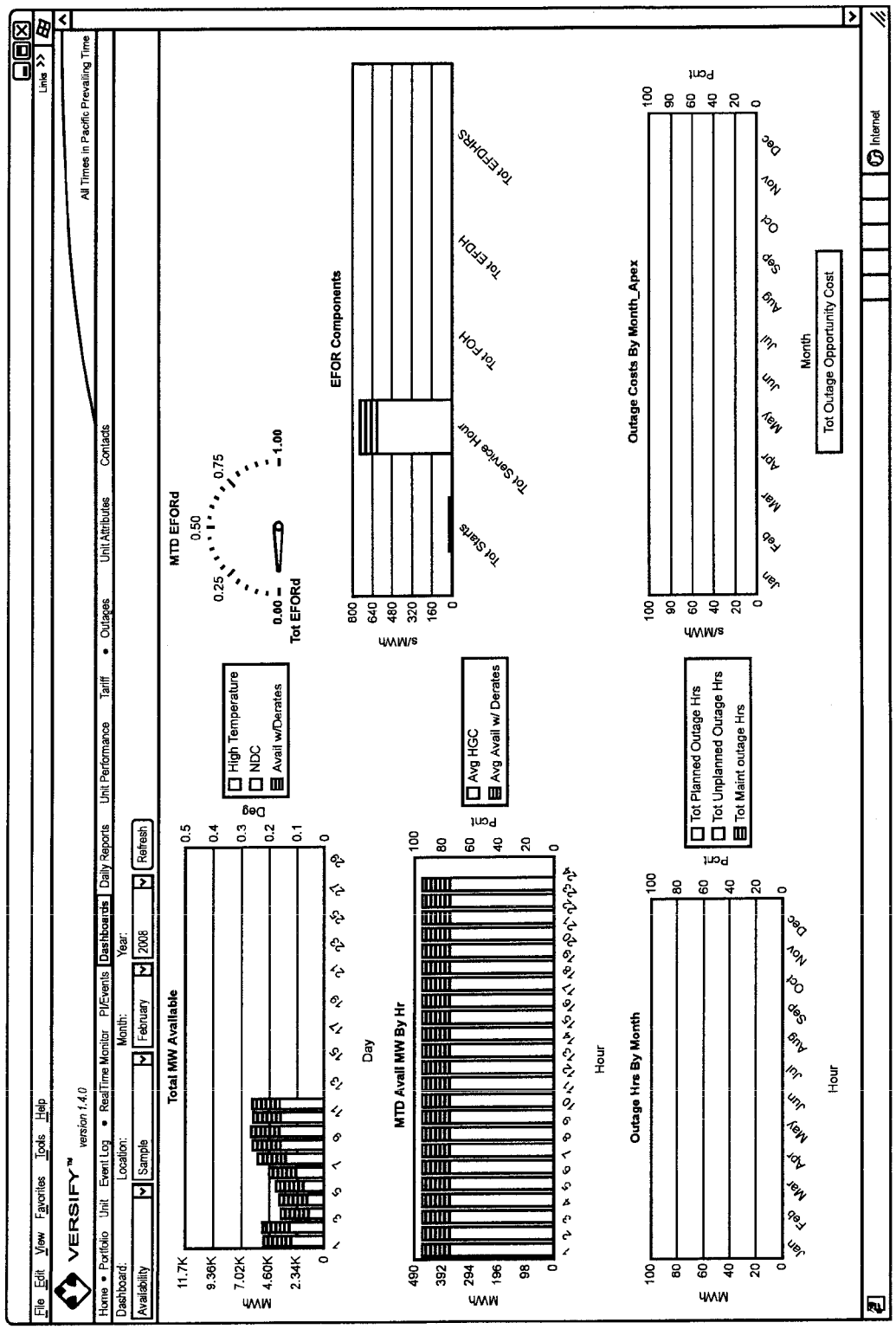
Figure 15D:
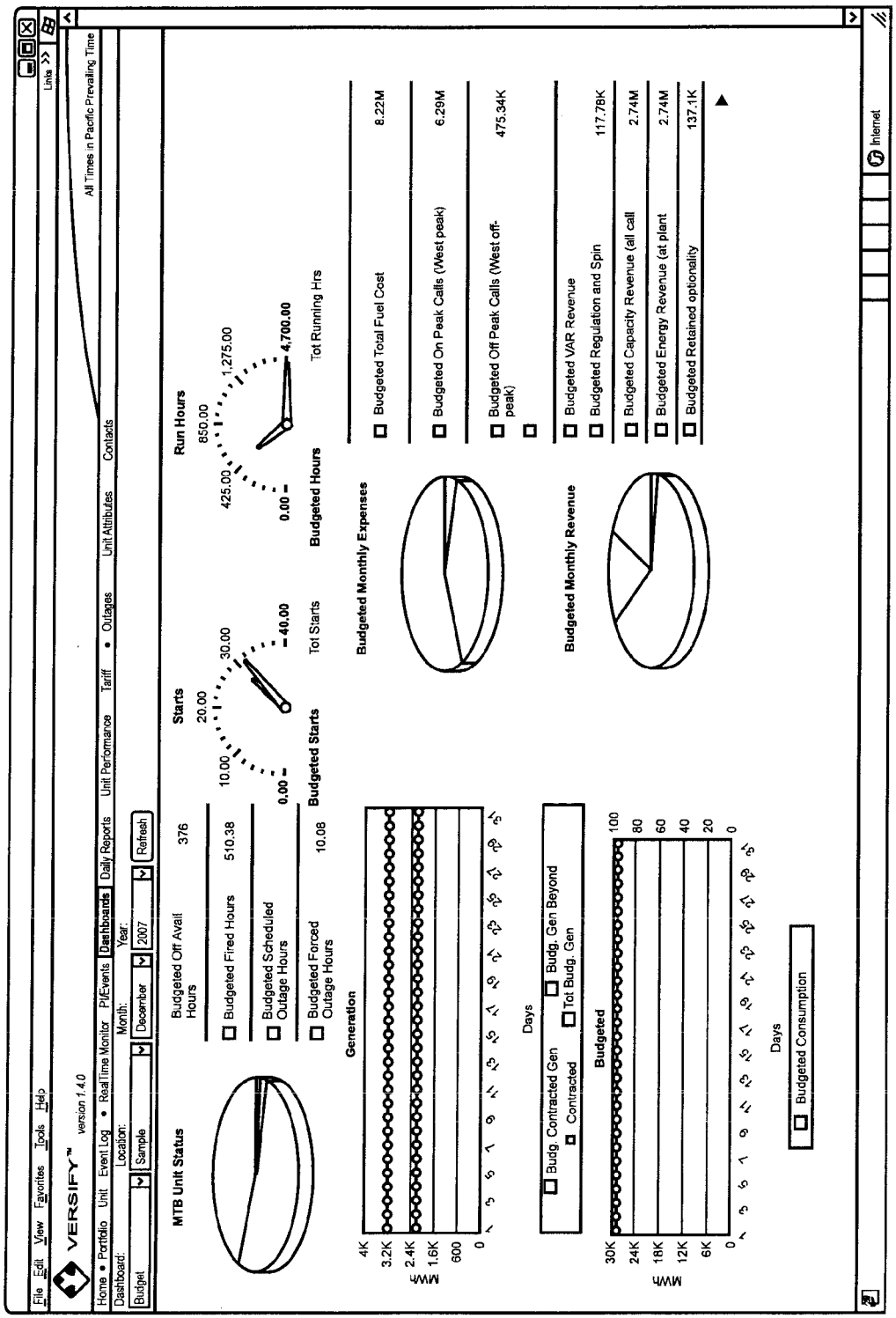
Figure 15E:
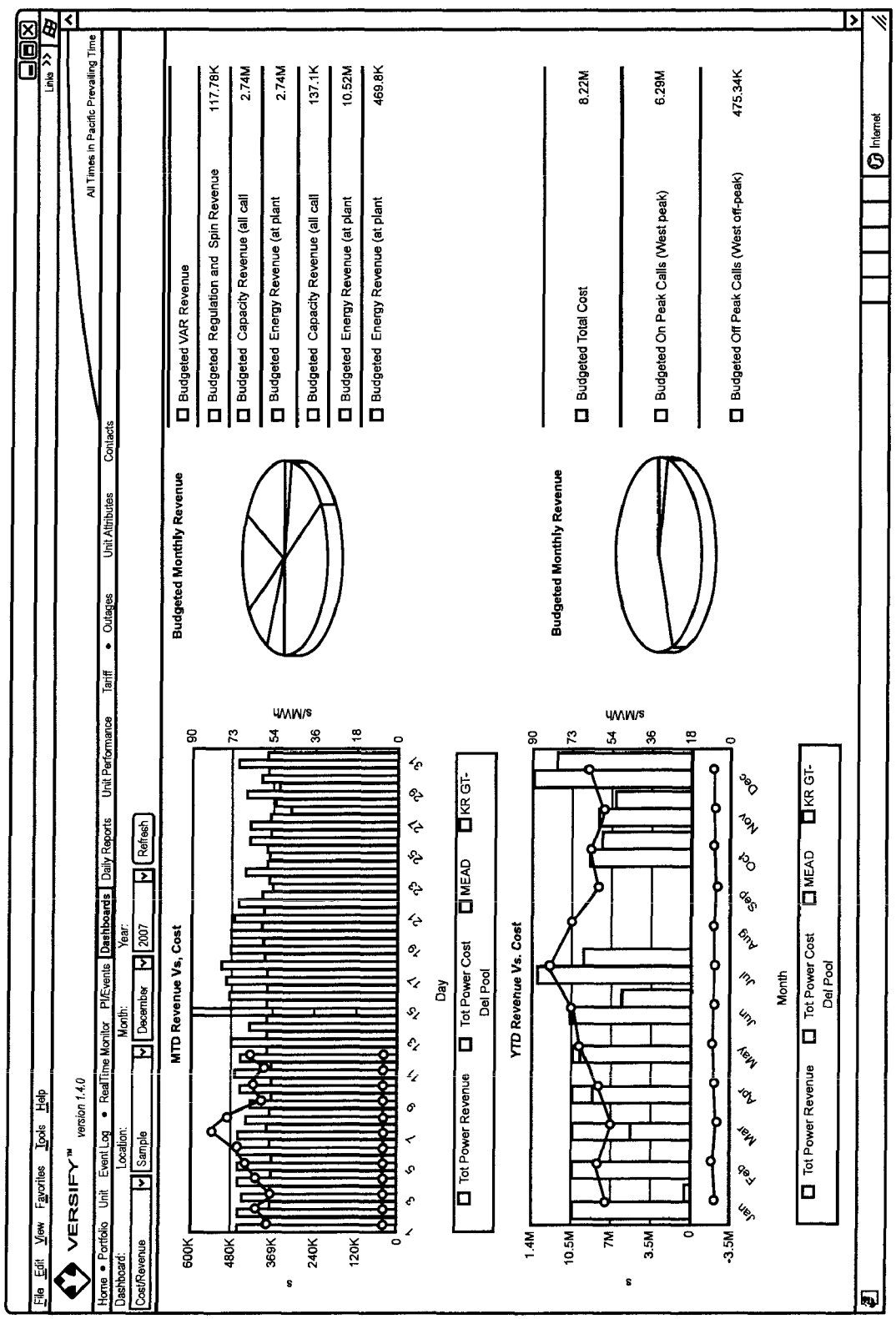
Figure 15F:
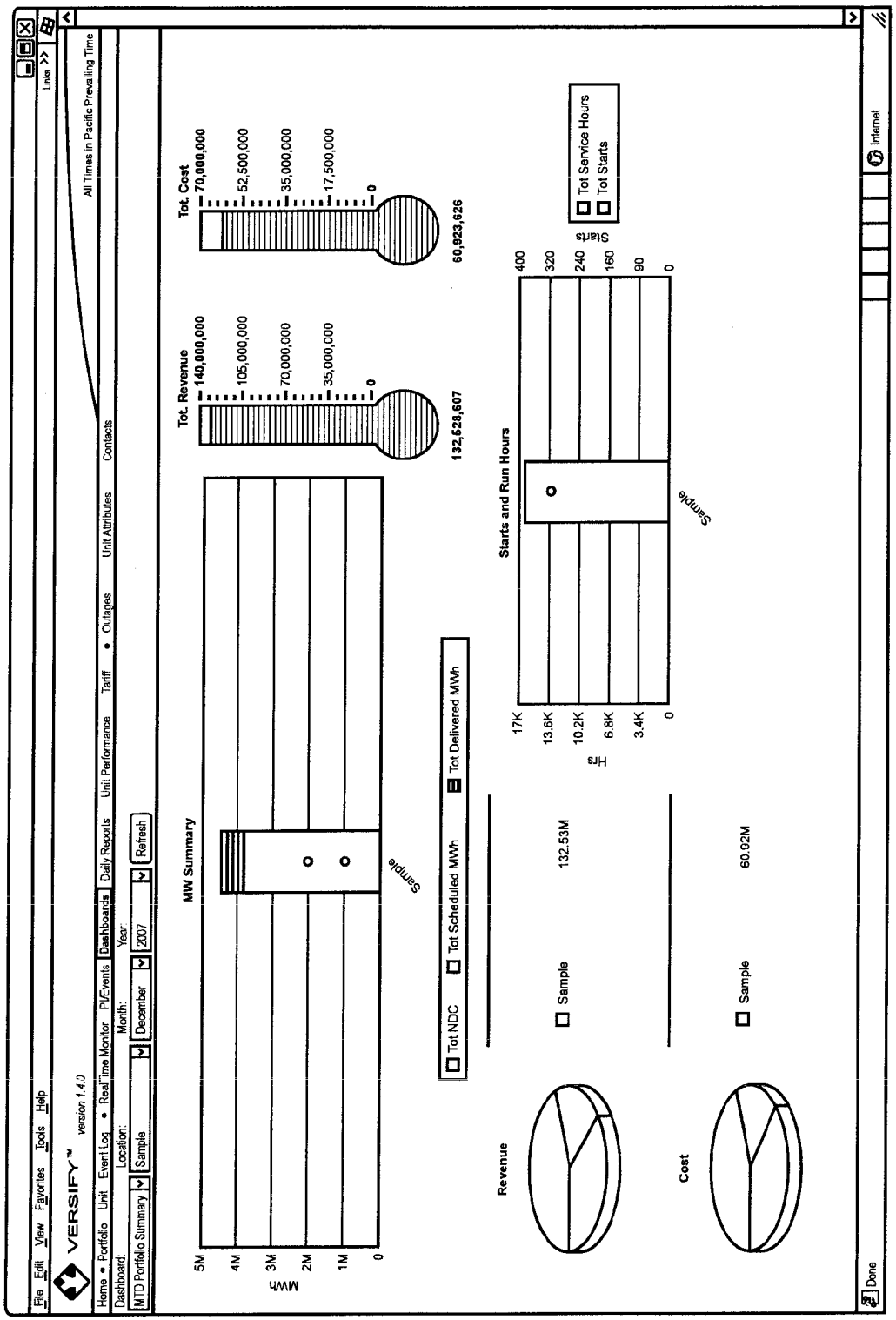
Figure 15G:
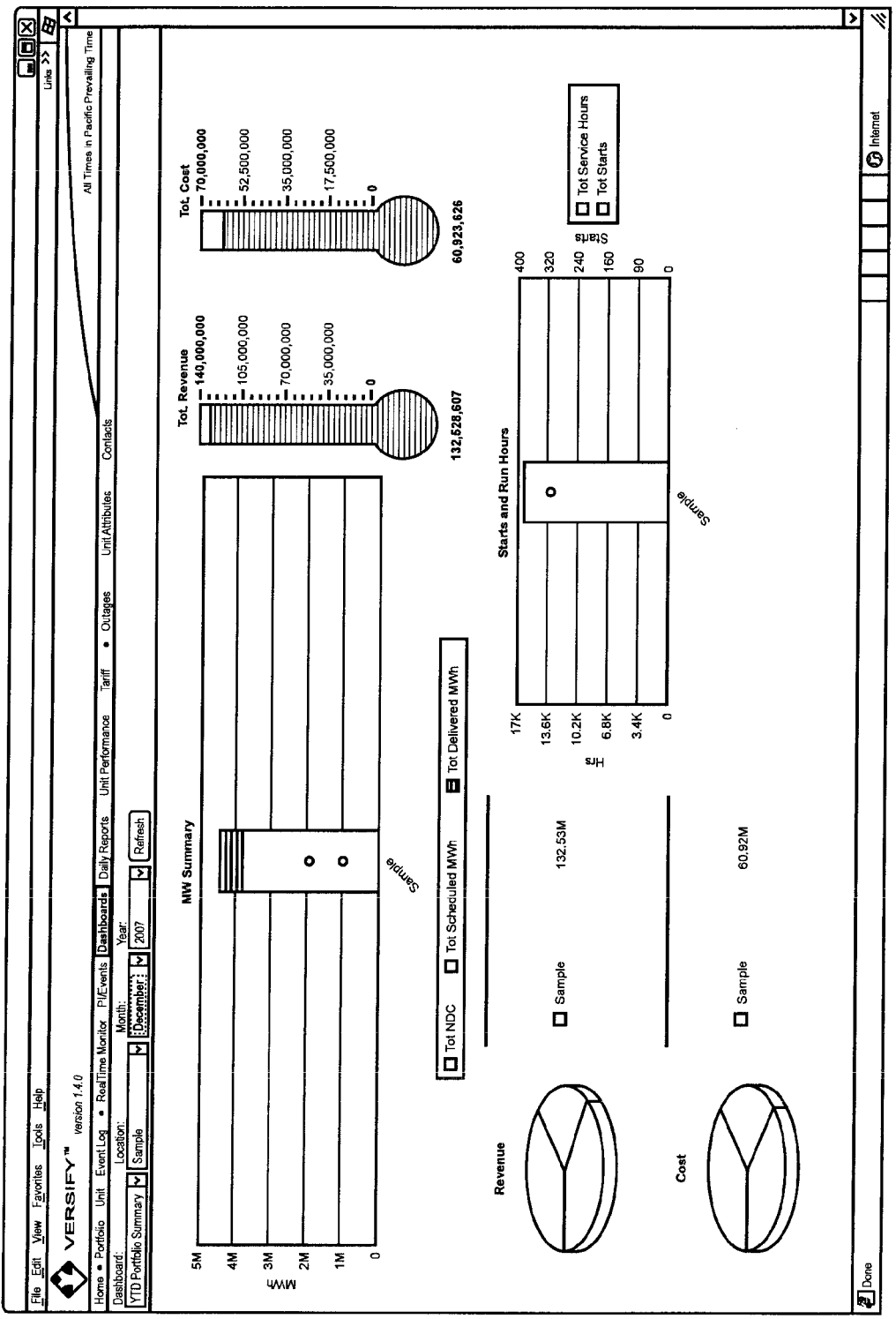
Figure 15H:
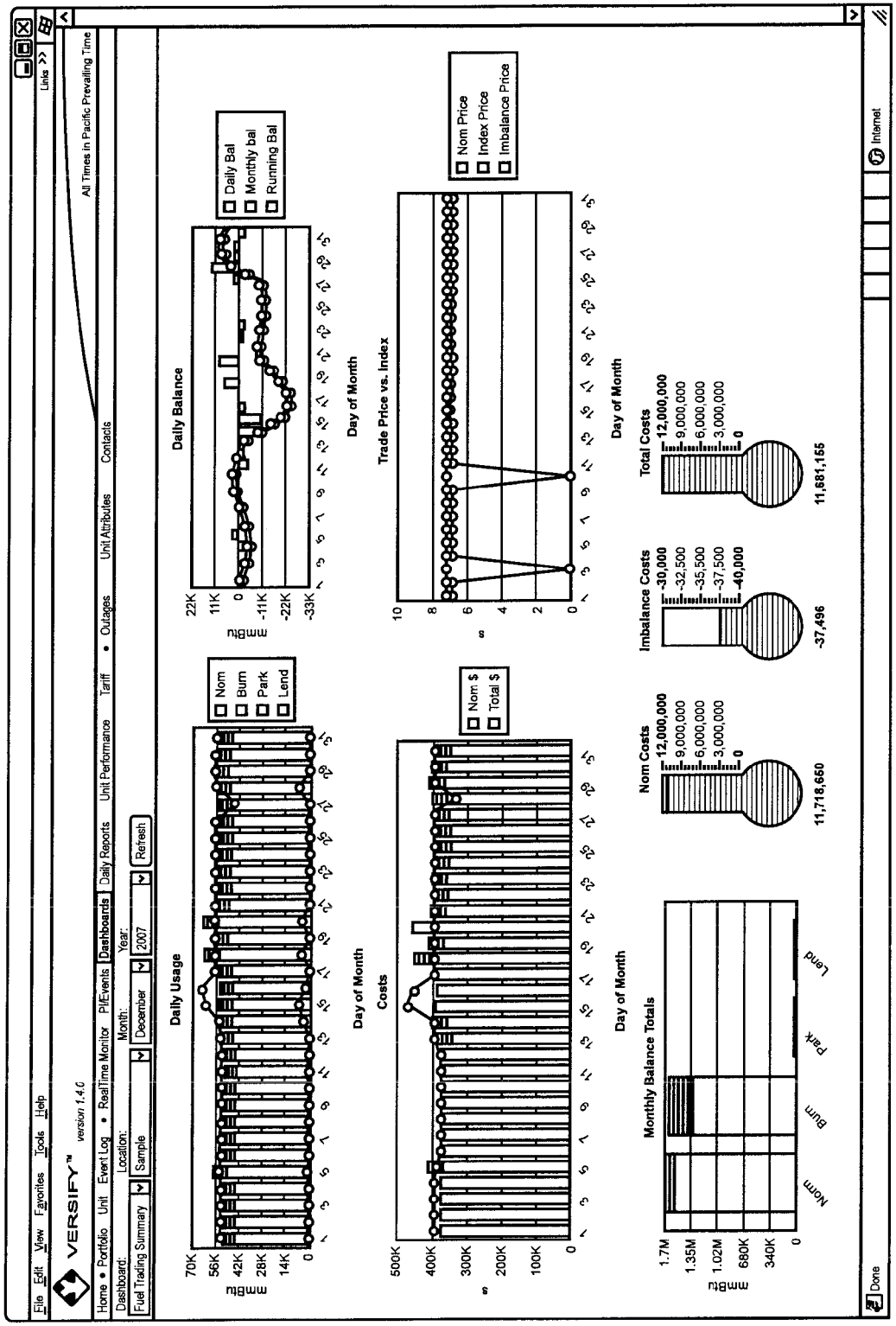
Figure 15I:
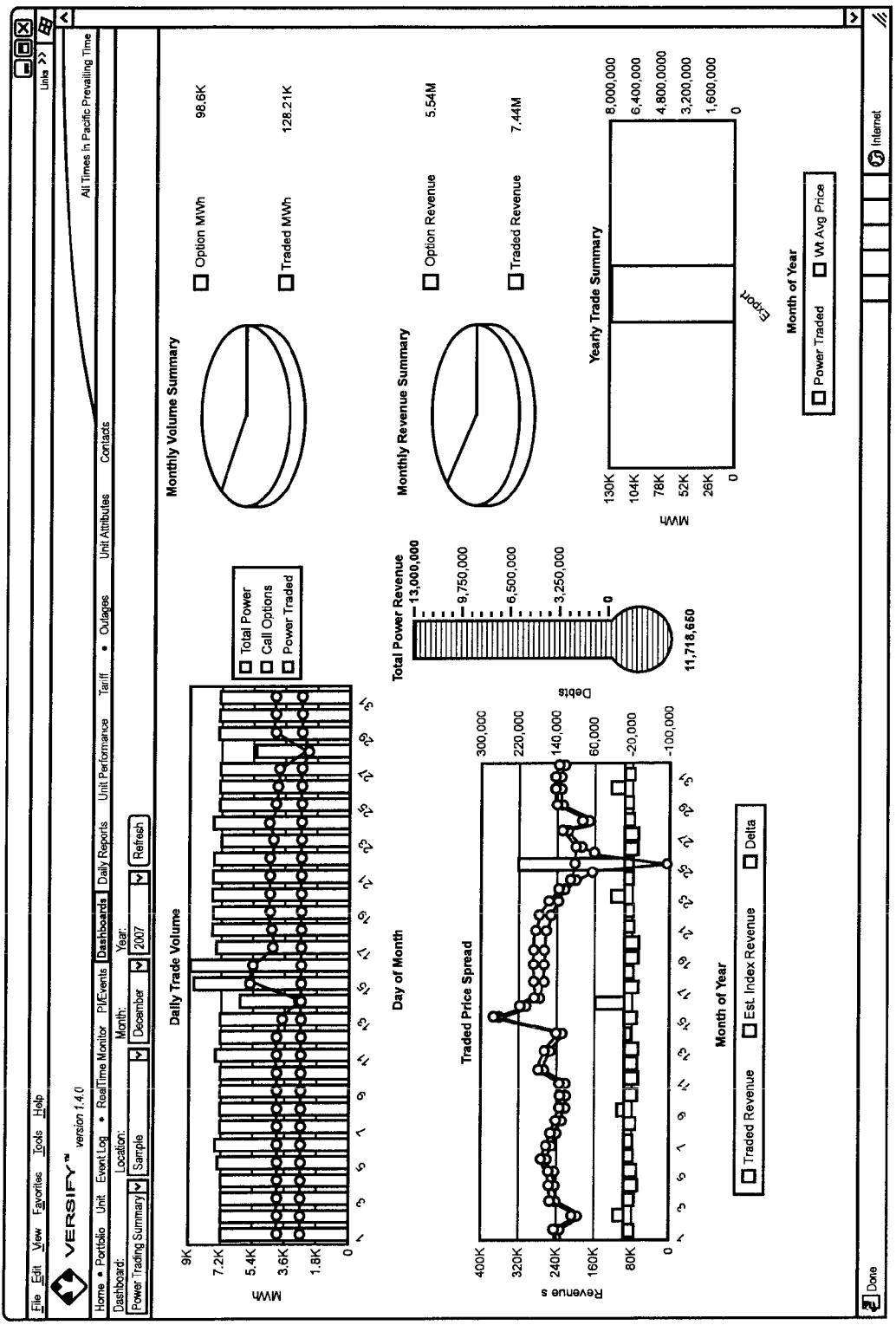
Figure 15J:
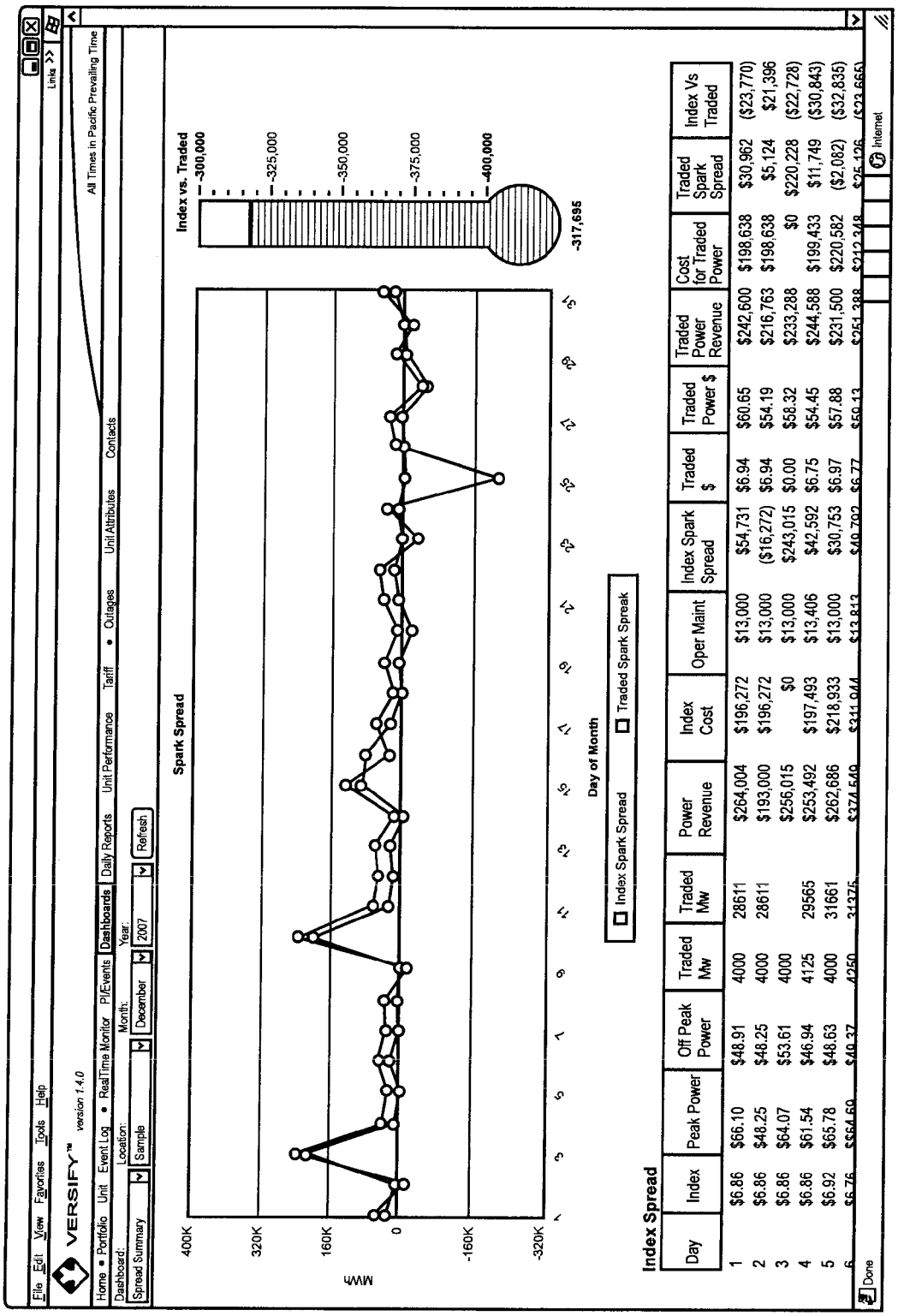
Figure 15K:
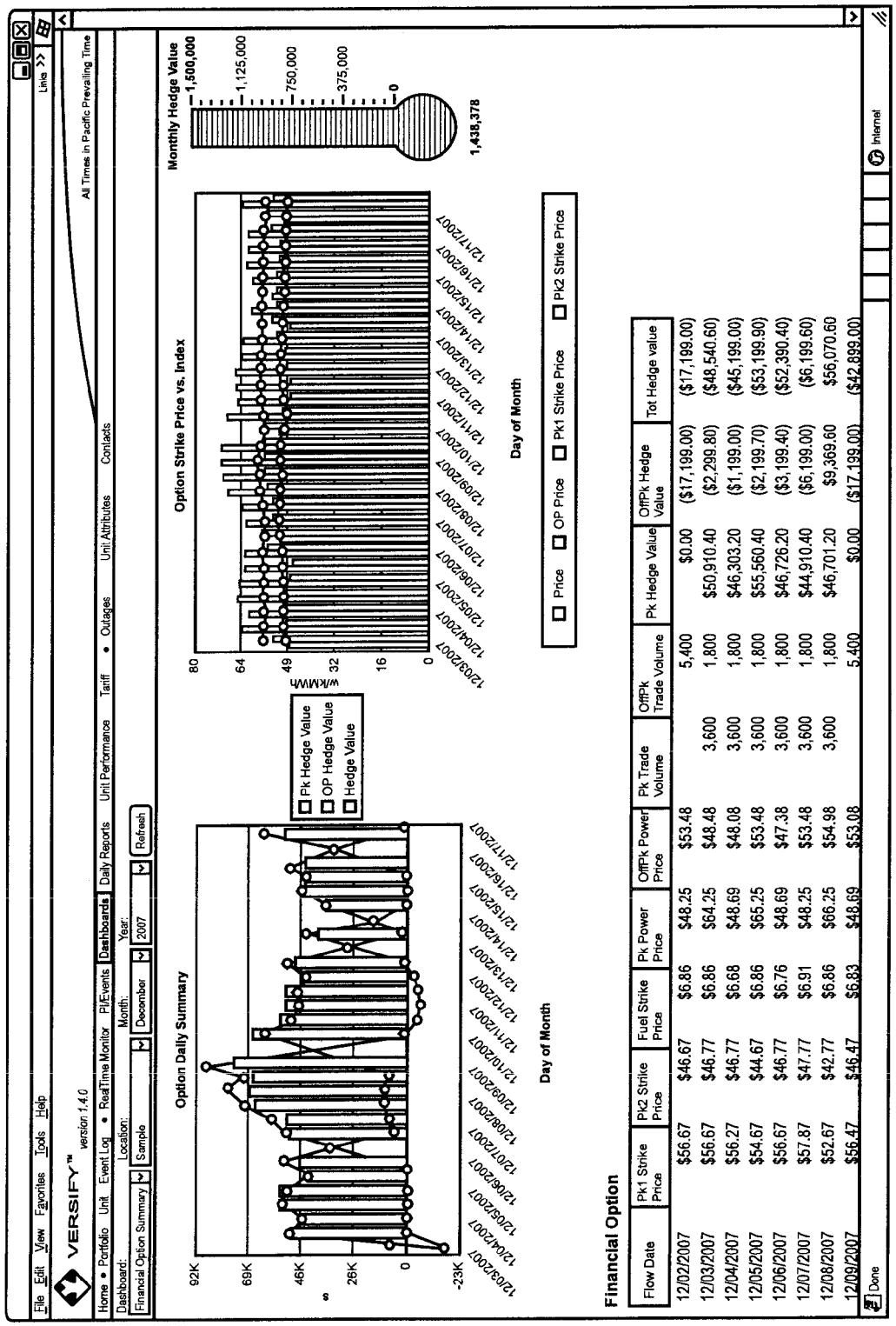

FIG. 14 shows a block diagram illustrating an exemplary embodiment of generating a report interface 1400 in accordance with the present invention. A reporting engine 410 processes the page config file 420 and reports config file 430, executes the stored procedures identified 440, and creates and formats the report objects on a report interface 450. The reporting engine 410 returns an HTML div containing the formatted report. The reporting engine 410 loads the reports config file 430 and identifies all of the stored procedures to call using an XPATH query. Once the reporting engine 410 has gathered a list of stored procedures, the reporting engine 410 executes each one, via a data access layer. By executing all stored procedures once and holding them in memory for report processing, extraneous database calls are eliminated to optimize performance. Each result set returned is stored in memory for the remainder of the report processing. The reporting engine then iterates through the report objects to build the actual report interface 450. Object classes are defined for each possible report object (e.g., chart, pie chart, gauge, thermometer, note, table, etc.). The object classes include logic to generate HTML and format data appropriately for each type of report object. For each report object, the reporting engine 410 creates an instance of the class and initializes the object generating basic HTML required. The reporting engine 410 then iterates through each mapped data item to be illustrated in the report object and passes the data item to the class from the appropriate result set extracted from the database earlier. The class processes the data into HTML (or XML) for the report item and finally returns the completely formatted HTML, which is then inserted into the HTML div tags.

In an exemplary embodiment of the present invention, the report interface 450 is categorized as one of the following: dashboard report interface, daily operational report interface, quantitative summary/drill-down report interface (also referred to as "unit performance" interface), an ad-hoc SCADA query interface, and unit status communication interface.

FIGS. 15A-15K show exemplary embodiments of the dashboard report interface 1500A-K. The dashboards page allows users to select any configured dashboard for any distributed demand response assets within the data store 18. FIGS. 15A-15K show exemplary embodiments of the following dashboards, respectively: Operations 1500A, Megawatts (MW), 1500B, Availability 1500C, Budget 1500D, Cost/Revenue 1500E, MTD Portfolio Summary 1500F, YTD Portfolio Summary 1500F, Fuel Trading Summary 1500H, Power Trading Summary 1500I, Spark Spread Summary 1500J, and Financial Option Summary 1500K. It is understood that other dashboard interfaces may be included without departing from the scope of the present invention. In the exemplary embodiment, each dashboard is run for a selected month. However, other time ranges may be used without departing from the scope of the invention. For example, the user may select a distributed demand response asset (i.e., location) and a month out of a year, and refresh the report. An XML:HTTP callback is made from the browser on the client device 40 to the web server 16. The web server 16 receives the XML:HTTP request and creates an instance of the reporting engine 410 described above. The reporting engine 410 builds the report interface 450 as described above, which may be an HTML div with report objects in it. The div is returned to the browser on the client device 40 that initiated the XML:HTTP call. The client device 40 refreshes the page on the screen with the newly created report. As shown in FIGS. 15A-15K, the dashboard interface includes a combination of report objects, such as gauges, bar graphs, line graphs, pie charts, and tables to provide an overall performance view of the selected location by integrating the qualitative and quantitative data obtained from the disparate data sources 20, converted into a common format, and stored in the data store 18. The report object may be animated as the information is provided to show movement of the various gauges, bar graphs, line graphs, pie charts, and other graphical representations.

Figure 16B:
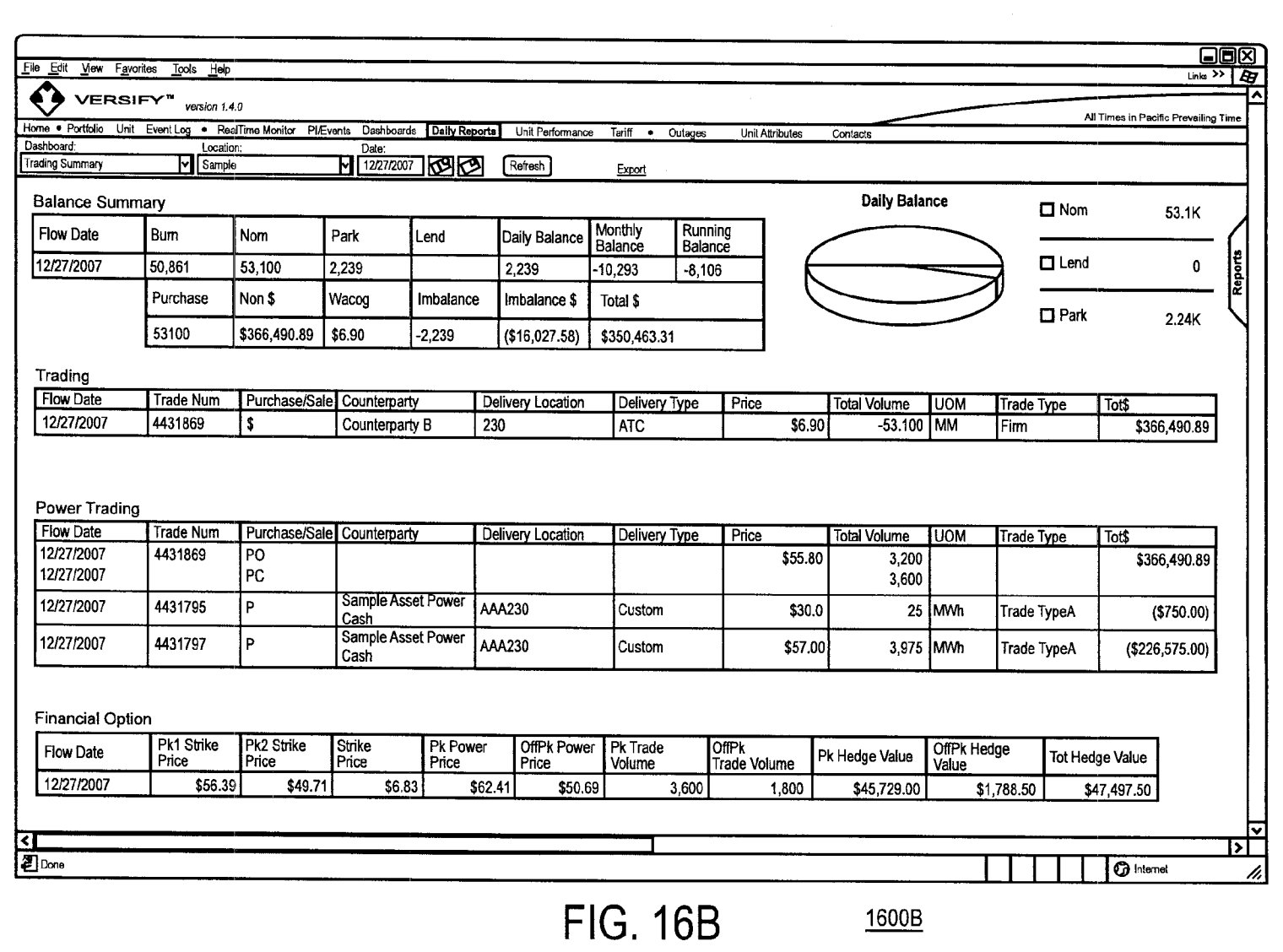

FIGS. 16A and 16B show exemplary embodiments of the daily report interface 1600A-B. The daily reports page allows a user to select a configured daily report. FIGS. 16A and 16B show the Daily Summary 1600A and Trading Summary 1600B, respectively. Other daily reports may include Day Forecasted Availability and Daily Log. It is to be understood that other daily summary reports may be included without departing from the scope of the invention. For example, the user selects a distributed demand response asset (i.e., location), a reporting day, and refreshes report. An XML:HTTP callback is made from the browser of the client device 40 to the web server 16. The web server 16 receives the XML:HTTP Request and creates an instance of the reporting engine 410 described above. The reporting engine 410 builds the report as described above, which may be an HTML div with report objects in it. The div is returned to the browser on the client device 40 that initiated the XML:HTTP call. The client device 40 refreshes the page on the screen with the newly created report. The daily report interface provides a summary of daily operational and financial activities of the selected location by integrating the qualitative and quantitative data obtained from the disparate data sources 20, converted into a common format, and stored in the data store 18.

Figure 17A:
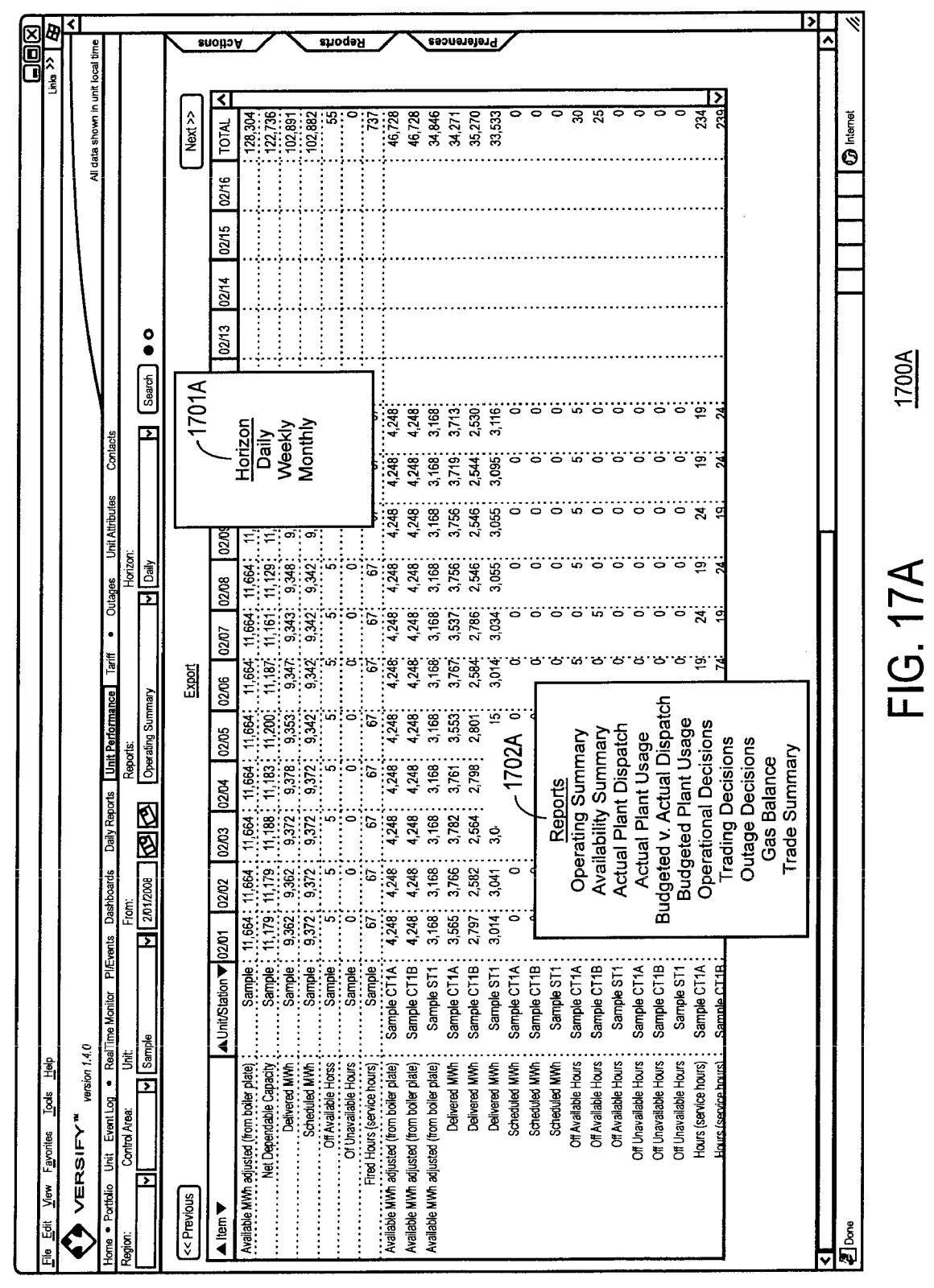
Figure 17B:
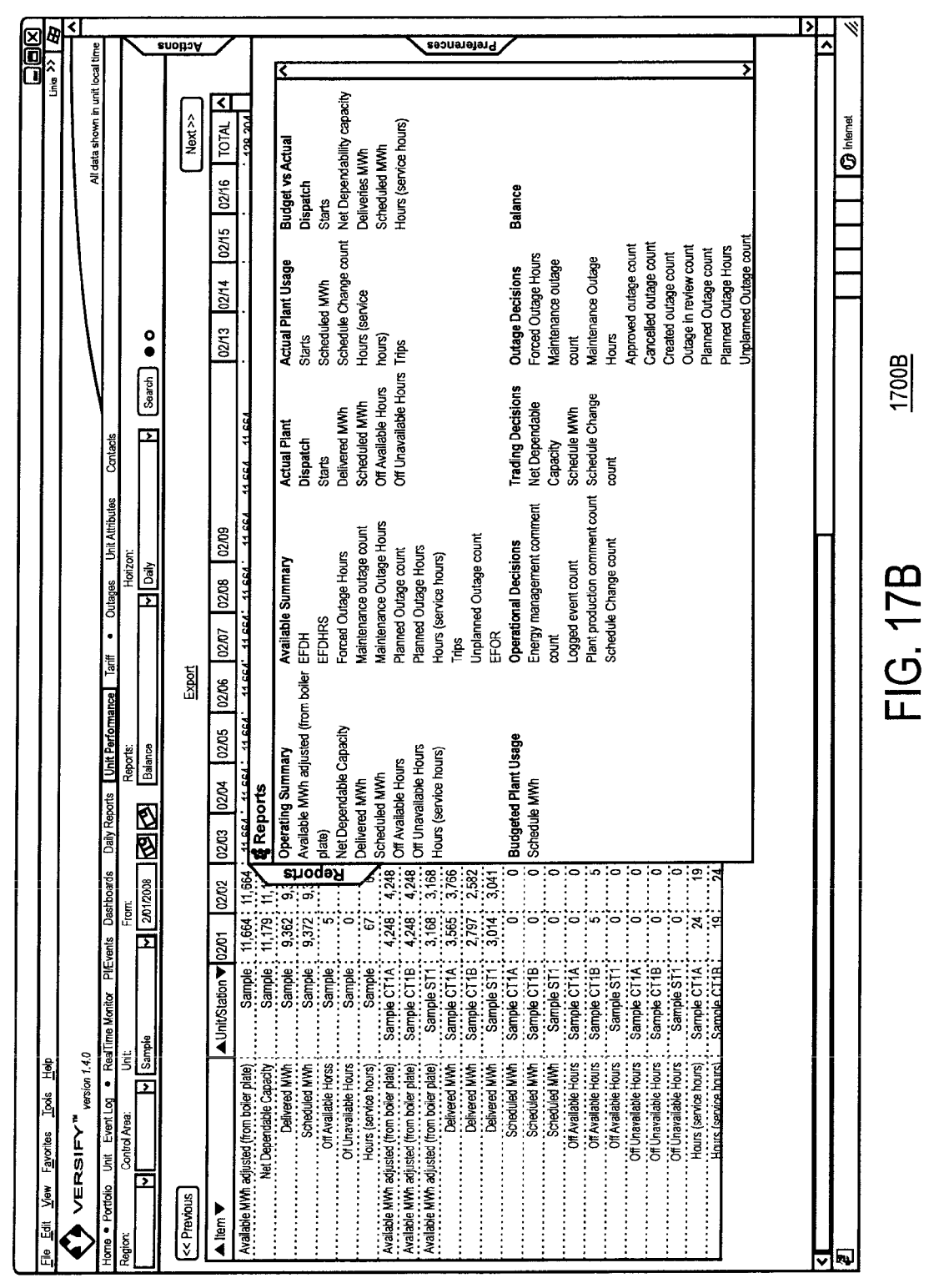

FIGS. 17A and 17B show exemplary embodiments of the unit performance report interface. The unit performance report interface 1700A includes quantitative reports 1701A for daily, weekly, and monthly time horizon, for example. In addition, the unit performance report interface includes drill down capability so that hourly detail report data may also be retrieved. In the exemplary embodiment, the unit performance report interface includes the following reports 1702A (all of which are also available for distributed demand response assets): Operating Summary, Availability Summary, Actual DR Load Dispatch, Actual DR Load Usage, Budgeted v. Actual Dispatch, Budged DR Load Usage, Operational Decisions, Trading Decisions, Outage Decisions, Gas Balance, and Trade Summary. It is understood that other summaries may be included without departing from the scope of the invention. In the exemplary embodiment, the unit performance report interface and the items displayed are maintained in an XML fragment in the unit performance page's reports config file 430. For example, a user selects a report, a time frame, and a time horizon to initiate the report. The browser of the client device 40 initiates a callback to the web server 16, which in turn calls a stored procedure 440. The stored procedure includes logic to summarize the data to the selected level (daily, weekly, monthly). When the result set is returned to the web server 16, the page is correctly formatted with the data into a table with the correct number of columns (e.g., based on daily, weekly, or monthly) and returns the table to the browser on the client device 40. As shown in FIG. 17B, the unit performance page 1700B also includes drill down capability to drill down into a finer granularity (e.g., hourly details). Database mapping tables are used to map summary items on the main page to the hourly detail. When a user clicks on a cell on the main report, the browser on the client device 40 initiates a callback. The callback request is received by the web server 16, and a stored procedure 440 is executed to retrieve mapped detail from the data store 18. The mapped detail is returned to the client device 40 as a table, for example.

Figure 18:
FIG. 18 illustrates an exemplary unit interface in accordance with the present invention.

FIGS. 18-21B show exemplary embodiments of ad-hoc SCADA query interface and unit status communication interface in accordance with the present invention. For example, FIG. 18 illustrates an exemplary unit interface 1800 that displays operational information of a selected unit. The information may include current status, operational statistics, schedules, event logs for the unit, and market data. The information may be displayed for a selected date. It is to be understood that other information regarding the selected unit may be included without departing from the scope of the invention.

Figure 19:
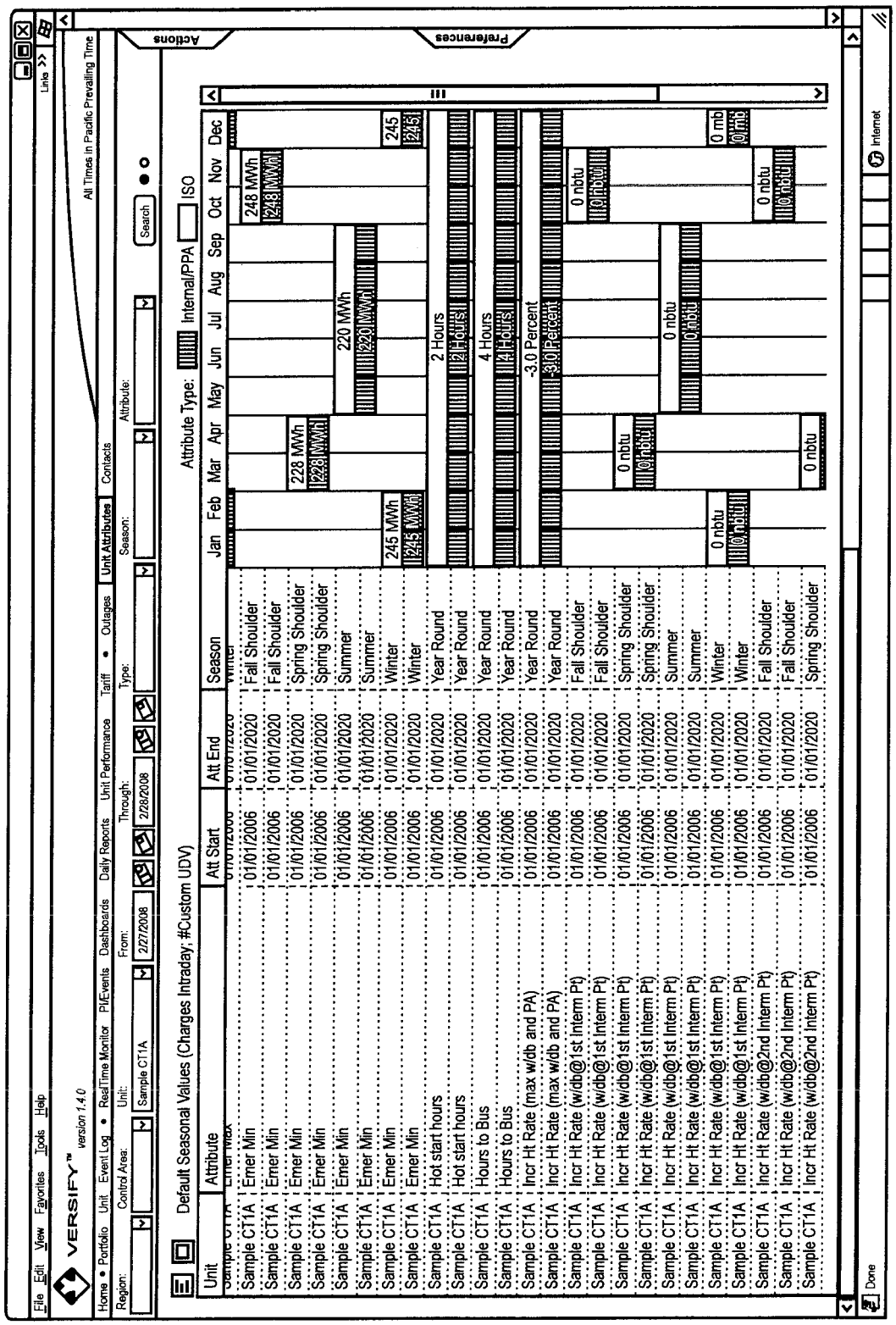
FIG. 19 illustrates an exemplary unit attribute interface in accordance with the present invention.

FIG. 19 illustrates an exemplary unit attribute interface 1900 that displays a summary of the operational attributes based on region, control area, unit, and date range, for example. Other criteria, such as type, season, and attribute may be selected for viewing.

FIG. 20 illustrates an exemplary event log interface 2000 for a selected unit. The event log may be sorted based on event type and date range, for example. In an exemplary embodiment, the event types 2001 may include, but not limited to: Actual Shutdown, Actual Start, Derate (max cap change), General Note, Schedule Change, Schedule Test, Schedule Update, Trip (max cap change), and Workorder Impacting Operations.

Figure 21B:
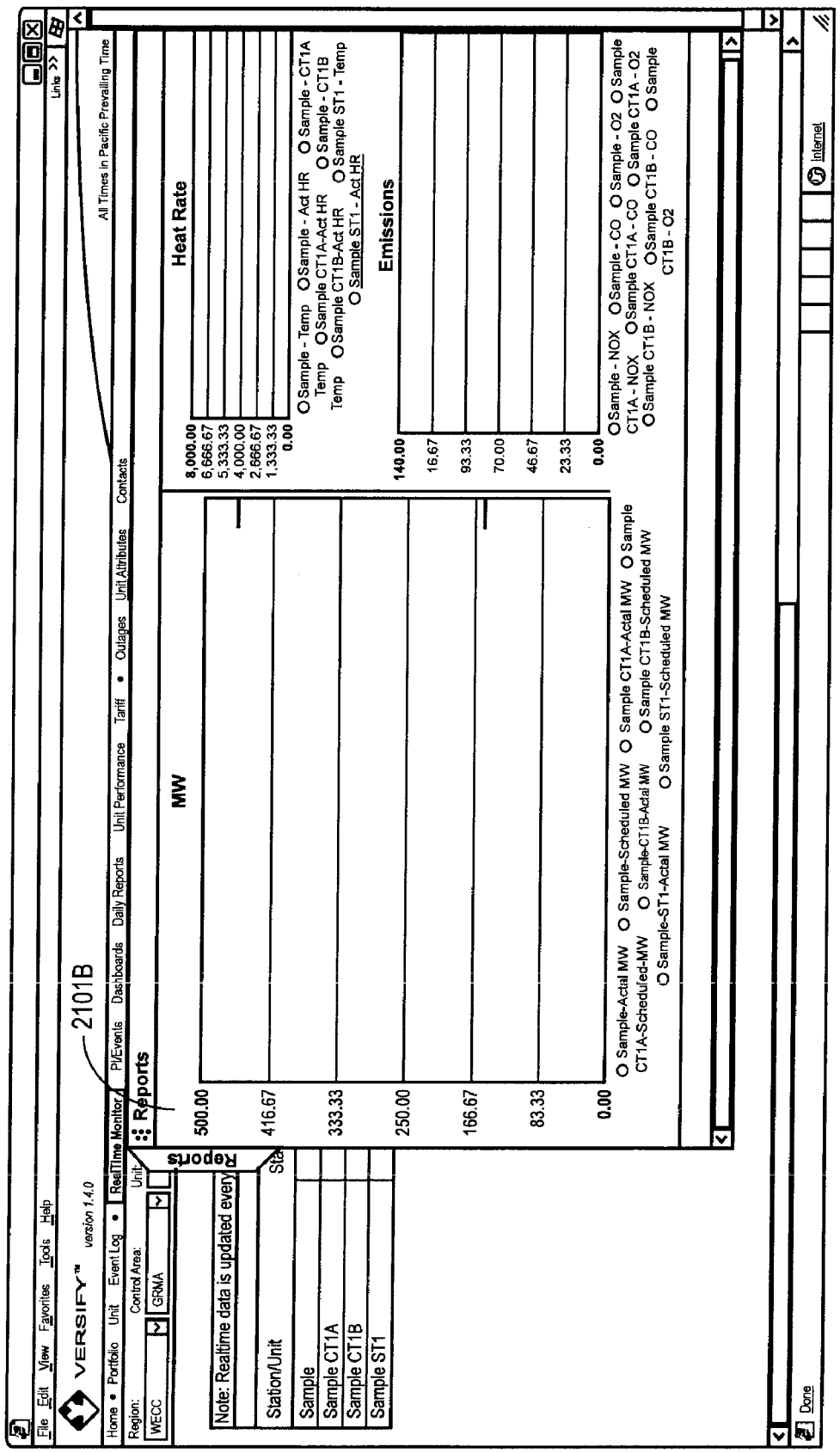

FIGS. 21A and 21B illustrate an exemplary (near) real time monitor 2100A-B for a selected unit. In an exemplary embodiment, the operational data of a hosted distributed demand response asset is updated every 3 minutes. However, period for update may be changed without departing from the scope of the present invention. The monitor may be selected based on region, control area, unit, and technology. Technology criteria 2101A may be include, but not limited to: BWR, CCGT Gas, CCGT Steam, Diesel, Fluidized Bed, Combustion, Fossil Steam, Gas Turbine, Geothermal, Hydro, Jet, Pumped Storage, PWR, and Wind Turbine. As shown in FIG. 21B, the real time monitor includes a pull-out 2101B to provide graphical representation of the monitored parameters, such as megawatt (MW), heat rate, and emissions. Other parameters may be included without departing from the scope of the present invention.

In addition to the real time monitoring, a feature of the present invention includes alarm monitoring and tracking of user-defined significant events. For example, the monitoring center 10 of the present invention tracks and logs when a hosted unit comes on-line or goes off-line. The monitoring center 10 tracks alarms against any generation operational parameter that is archived in the time-series data store 18. This is implemented by querying the time-series historical data store 18 for values archived for a selected operational parameter over a set time interval. For example, for a generator unit on-line alarm, the monitoring center 10 queries the historical archive in the data store 18 for a 15 minute interval and examines breaker status recorded during that timeframe. Any change in the monitored value represents an event, which triggers an alarm. Once examination for the given parameter and time period is complete, the monitored time interval is marked as examined and the alarm as tracked. Future monitoring of the historical archived data in the data store 18 will check subsequent intervals based on what has already been marked as examined.

The alarming feature is not limited to tracking on/off types or digital state data. Rather, monitored recorded events may also be examined based on numerical thresholds. For example, generation managers may wish to monitor megawatt (MW) levels and create different events based on the number of megawatts produced at a power generation/distributed demand response asset facility. The plant may want to be alerted when the megawatt (MW) level reaches a specific level, such as 100, 250, and 500. Each MW level reached requires a unique action or log entry to be recorded. Such alarms are defined in the monitoring center 10 to initiate tracking and logging. For example, in an exemplary embodiment of the present invention, alarms may be defined by noting the following data points:
  Archive historian database;
  Archive historian data point to monitor;
  Compare value (or alarm value);
  Alarm log message to create when value is greater than comparison value;
  Alarm log message to create when value is less than comparison value; and
  Alarm log message to create when value is equal than comparison value.

To ensure all intervals are examined, examined archived data may be marked by noting:
  Archive historian point examined;
  Alarm that is tracked;
  Examination start time; and
  Examination end time.

This serves to baseline subsequent interval checks. It is to be understood that other notations may be made without departing from the scope of the present invention.

In accordance with an exemplary embodiment of the system and method of the present invention, monitoring of any number of hosted power generation/distributed demand response assets is realized by collecting qualitative (e.g., event data) and quantitative (e.g., cost, market data) information from a plurality of disparate data sources, converting the disparate data into a common data format, and storing the transformed data to be served up through a communications network, such as the Internet, to a plurality of client devices that may be located anywhere in the world. The various report interfaces in accordance with the present invention allows the user to monitor the performance of the hosted power generation/distributed demand response assets including a comparison of the actual performance of the monitored unit with expected (i.e., budgeted) performance. The system and method of the present invention generates reports using XML config files to reduce the time to build and customize any number of reports. The XML config files allows developers to simply map data from database stored procedures directly to a report without writing any code to reduce the time required to deliver a report and eliminate the need for any code changes to existing applications.

It will be apparent to those skilled in the art that various modifications and variations can be made in the system and method of the present invention without departing from the spirit or scope of the invention.

For example, while the following description is directed to increasing power capacity to the grid by providing aggregated power provided by the demand response assets (i.e., demand-side solution), the system and method of the present invention can also increase power capacity to the grid by providing aggregated power from micro-generators, also referred to as distributed generation (i.e., supply-side solution). Distributed generation is a form of distributed generation that aggregates power generated from auxiliary power generators from large commercial and industrial users rather than reducing or balancing the load on the grid by turning down/off demand loads.

Thus, it is intended that the present invention cover the modifications and variations of this invention provided they come within the scope of the appended claims and their equivalents.

What is claimed is:

1. A system, comprising:
a database to store demand response data, the demand response data including demand response agreement parameters, demand response load and energy demand characteristics of one or more demand response customers, the demand response load characteristics including power consumption capacity of each of one or more demand response loads;
an aggregator to aggregate the demand response loads based on the demand response data and forecast data into a demand response portfolio;
a monitor to monitor power demand of one or more demand response customers and one or more power grids; and
a dispatcher to notify the one or more demand response customers of the demand response portfolio and to notify a utility of a response from the one or more demand response customers whether to control the demand response load to return the power consumption capacity of the demand response load back to the one or more power grids;
wherein the aggregator aggregates demand response assets to participate in energy markets based on one or more forecasted financial requirements in the markets.

2. The system of claim 1, wherein the demand response data includes geocodes for each of the one or more demand response loads.

3. The system of claim 1, wherein the forecast data includes operational data, market data and weather data.

4. A computer-implemented method, comprising:
collecting demand response data, the demand response data including demand response agreement parameters, demand response load and energy demand characteristics of one or more demand response customers, the demand response load characteristics including power consumption capacity of each of one or more demand response loads;
aggregating the demand response loads based on the demand response asset data and forecast data into a demand response portfolio, wherein the demand response assets are aggregated to participate in energy markets based on one or more forecasted financial requirements in the markets;
monitoring power demand of the one or more demand response customers and one or more power grids;
notifying one or more demand response customers of the demand response portfolio; and
notifying a utility of a response from the one or more demand response customers whether to control the demand response load to return the power consumption capacity of the demand response load back to the one or more power grids.

5. The method of claim 4, wherein the demand response data includes geocodes for each of the one or more demand response loads.

6. The method of claim 4, wherein the forecast data includes operational data, market data and weather data.

7. A non-transitory computer-readable storage medium, storing one or more programs configured for execution by one or more processor, the one or more programs comprising instructions to:
collect demand response data, the demand response data including demand response agreement parameters, demand response load and energy demand characteristics of one or more demand response customers, the demand response load characteristics including power consumption capacity of each of one or more demand response loads;
aggregate the demand response loads based on the demand response asset data and forecast data into a demand response portfolio, wherein the demand response assets are aggregated to participate in energy markets based on one or more forecasted financial requirements in the markets;
monitor power demand of the one or more demand response customers and one or more power grids;
notify one or more demand response customers of the demand response portfolio; and
notify a utility of a response from the one or more demand response customers whether to control the demand response load to return the power consumption capacity of the demand response load back to the one or more power grids.

8. The computer-readable storage medium of claim 7, wherein the demand response data includes geocodes for each of the one or more demand response loads.

9. The computer-readable storage medium of claim 7, wherein the forecast data includes operational data, market data and weather data.

* * * * *